(12) United States Patent
Pastorini et al.

(10) Patent No.: US 12,227,663 B2
(45) Date of Patent: Feb. 18, 2025

(54) FLAME RETARDANT MATERIALS

(71) Applicant: BOREALIS AG, Vienna (AT)

(72) Inventors: Mirela Tury Pastorini, Linz (AT); Johan Defoer, Beringen (BE); Carl-Gustaf Ek, Stenungsund (SE); Gavin Lewis, Yorkshire (GB)

(73) Assignee: BOREALIS AG, Vienna (AT)

( * ) Notice: Subject to any disclaimer, the term of this patent is extended or adjusted under 35 U.S.C. 154(b) by 344 days.

(21) Appl. No.: 17/786,141

(22) PCT Filed: Dec. 18, 2020

(86) PCT No.: PCT/EP2020/087283
§ 371 (c)(1),
(2) Date: Jun. 16, 2022

(87) PCT Pub. No.: WO2021/123354
PCT Pub. Date: Jun. 24, 2021

(65) Prior Publication Data
US 2023/0303886 A1 Sep. 28, 2023

(30) Foreign Application Priority Data
Dec. 18, 2019 (EP) .................................. 19217715

(51) Int. Cl.
*C09D 123/08* (2006.01)
*C09D 5/00* (2006.01)
(Continued)

(52) U.S. Cl.
CPC ....... *C09D 123/0815* (2013.01); *C09D 5/002* (2013.01); *C09D 5/18* (2013.01);
(Continued)

(58) Field of Classification Search
CPC .... C09D 123/0815; C09D 5/002; C09D 5/18; C09D 7/61; D06N 3/0009; D06N 3/0038;
(Continued)

(56) References Cited

U.S. PATENT DOCUMENTS

| 4,507,536 A | 3/1985 | Inoue |
|---|---|---|
| 5,504,172 A | 4/1996 | Imuta et al. |

(Continued)

FOREIGN PATENT DOCUMENTS

| EP | 1862496 B1 | 1/2013 |
|---|---|---|
| EP | 3173443 A1 | 5/2017 |

(Continued)

OTHER PUBLICATIONS

International Search report and Written Opinion issued for Application No. PCTEP2020087283, dated May 11, 2021, 14 pages.
(Continued)

*Primary Examiner* — Michael C Miggins
(74) *Attorney, Agent, or Firm* — Meunier Carlin & Curfman LLC

(57) ABSTRACT

The invention provides a flame retardant material comprising a substrate, an optionally corona-treated coating on the substrate, the coating comprising a polyolefin composition comprising a) an ethylene based plastomer with a density in the range of 0.857 to 0.915 g/cm$^3$ and an MFR$_2$ in the range 0.5-30 g/10 min; b) a propylene based plastomer with a density in the range of 0.860 to 0.910 g/cm$^3$ and an MFR$_2$ in the range 0.01-30 g/10 min; and c) a flame retardant, a primer layer on top of the coating and a lacquer topcoat.

19 Claims, 3 Drawing Sheets

(51) Int. Cl.
*C09D 5/18* (2006.01)
*C09D 7/61* (2018.01)
*D06N 3/00* (2006.01)
*D06N 3/04* (2006.01)
*D06N 3/18* (2006.01)

(52) U.S. Cl.
CPC ............ *C09D 7/61* (2018.01); *D06N 3/0009* (2013.01); *D06N 3/0038* (2013.01); *D06N 3/0059* (2013.01); *D06N 3/045* (2013.01); *D06N 3/047* (2013.01); *D06N 3/183* (2013.01); *D06N 2201/0254* (2013.01); *D06N 2203/042* (2013.01); *D06N 2203/044* (2013.01); *D06N 2207/14* (2013.01); *D06N 2209/067* (2013.01); *D06N 2209/1635* (2013.01); *D06N 2211/103* (2013.01); *D10B 2503/04* (2013.01); *D10B 2505/08* (2013.01); *D10B 2505/10* (2013.01); *D10B 2507/00* (2013.01)

(58) Field of Classification Search
CPC ...... D06N 3/0059; D06N 3/045; D06N 3/047; D06N 3/183; D06N 2201/0254; D06N 2203/042; D06N 2203/044; D06N 2207/14; D06N 2209/067
See application file for complete search history.

(56) References Cited

U.S. PATENT DOCUMENTS

| 7,815,765 | B2 | 10/2010 | Wang |
|---|---|---|---|
| 8,263,707 | B2 | 9/2012 | Datta et al. |
| 2013/0052900 | A1 | 2/2013 | Jung et al. |
| 2013/0072623 | A1 | 3/2013 | Krabbenborg |

FOREIGN PATENT DOCUMENTS

| EP | 3281973 | A1 | 2/2018 |
|---|---|---|---|
| EP | 3031853 | B1 | 5/2019 |
| JP | H06145436 | A | 5/1994 |
| JP | 2003164680 | A | 6/2003 |
| JP | 2004106513 | A | 4/2004 |
| JP | 2018199788 | A | 12/2018 |
| KR | 2017079730 | A | 7/2017 |
| RU | 2352601 | C2 | 4/2009 |
| WO | 2000001745 | A1 | 1/2000 |
| WO | 2008/057881 | A1 | 5/2008 |
| WO | 2008/080111 | A1 | 7/2008 |
| WO | 2009/064993 | A1 | 5/2009 |
| WO | 2011/008336 | A1 | 1/2011 |
| WO | 2011/011124 | A1 | 1/2011 |
| WO | 2015/135113 | A1 | 9/2015 |
| WO | 2016/017804 | A1 | 2/2016 |
| WO | 2019/238943 | A1 | 12/2019 |
| WO | 2019/238957 | A1 | 12/2019 |
| WO | 2021/074283 | A1 | 4/2021 |
| WO | 2021/074285 | A1 | 4/2021 |

OTHER PUBLICATIONS

Encyclopedia of Polymer Science and Engineering, vol. 6 (1986), pp. 383-410.
Klimesch et al. Encyclopedia of Materials: Science and Technology, 2001 Elsevier Science Ltd.: "Polyethylene: High-pressure", pp. 7181-7184.

FLAME RETARDANT MATERIALS

The present invention relates to flame retardant materials with good durability, in particular materials comprising a substrate with a corona-treated coating of a flame retardant polyolefin composition, a primer layer on top of the coating layer, and a lacquer topcoat. The present invention also relates to articles comprising such materials and to processes to make such materials.

BACKGROUND

Polymer coated textile materials are used in a wide range of applications such as carpets, mattresses, pillows and seat upholstery for office furniture, car interiors etc. Such materials desirably have a good degree of softness as well as attractive abrasion and UV resistance properties. For commercial applications, durability of the materials, including resistance to cracking and delamination over time, is also highly desirable.

It is also important that the materials comply with safety legislation concerning flame retardancy. With growing consumer demands and new legislations, the development of new systems is an on-going process.

To date, the most widely used polymer in such coatings is polyvinyl chloride (PVC). When PVC products are burned, hydrogen chloride gas is produced. This interferes with the combustion process in the gas phase, eliminating high energy H and OH radicals, which has the effect of starving the burning material of oxygen. However, these acrid fumes can cause additional problems such as corrosion. More significantly perhaps, are the environmental challenges associated with using PVC. PVC is not biodegradable, in fact it is not degradable at all, and it is very difficult to recycle. There thus remains a need to search for alternative materials which are suitable replacements for PVC.

Polyurethane has also been employed, however its use is not always compatible with environments which employ harsh cleaners or disinfectants. Cracking can also occur when it is exposed to either too much humidity or varying temperatures.

The manufacture of PVC or polyurethane fabrics often involves multiple coating steps using liquids, plus the use of adhesives, requiring complex production lines and heated ovens to dry/cure various layers after they are applied. Alternative coated fabrics which are simple to manufacture are therefore also desirable.

The present inventors have surprisingly found that the durability of substrates coated with a flame retardant polyolefin composition comprising a mixture of an ethylene based plastomer and a propylene based plastomer, together with a flame retardant, can be significantly improved by corona treatment followed by application of a primer and a lacquer topcoat. The materials are relatively simple to manufacture. As well as good durability, the resulting materials also possesses flame retardant properties which meet with Industry standards. Ideally, the materials also have good UV resistance and attractive mechanical properties. Materials which have good recyclability, even up to 100% recyclability, would be of particular value.

SUMMARY OF INVENTION

Viewed from one aspect the invention provides a flame retardant material comprising:

(a) a substrate;
(b) a coating on the substrate, wherein the coating is optionally corona-treated, the coating comprising a flame retardant polyolefin composition (X) comprising:
 (i) an ethylene based plastomer with a density in the range of 0.857 to 0.915 g/cm$^3$ and an MFR$_2$ (190° C.; 2.16 kg) in the range 0.5 to 30 g/10 min;
 (ii) a propylene based plastomer with a density in the range of 0.850 to 0.910 g/cm$^3$ and an MFR$_2$ (230° C./2.16 kg) in the range 0.01 to 30 g/10 min; and
 (iii) a flame retardant (FR);
(c) a primer layer on top of the coating; and
(d) a lacquer topcoat on top of the primer layer.

Viewed from another aspect, the invention provides a process for producing a flame retardant material comprising (a) a coated substrate, wherein the coated substrate is optionally corona treated, the coating comprising, or consisting of, a flame retardant polyolefin composition (X) comprising:
 (i) an ethylene based plastomer with a density in the range of 0.857 to 0.915 g/cm$^3$ and an MFR$_2$ (190° C.; 2.16 kg) in the range 0.5 to 30 g/10 min;
 (ii) a propylene based plastomer with a density in the range of 0.850 to 0.910 g/cm$^3$ and an MFR$_2$ (230° C.; 2.16 kg) in the range 0.01 to 30 g/10 min; and
 (iii) a flame retardant (FR);
(b) a primer layer on top of the coating; and
(c) a lacquer topcoat on top of the primer layer;
said process comprising:
(A) providing a coated substrate;
(B) applying a primer layer to the coated substrate of step (A); and
(C) applying a lacquer topcoat on top of the primer layer.

Preferably, the coated substrate in step (A) is a corona-treated coated substrate, i.e. is a coated substrate which has been subjected to a corona treatment.

Optionally, the process further comprises an embossing step after step (A) and before step (B) and/or an embossing step after step (C).

Viewed from a further aspect, the invention provides an article comprising at least one component formed from a coated substrate as hereinbefore defined.

The combination of primer and topcoat, and optional corona treatement, is expected to significantly improve the durability of the coated substrate, including resistance to cracking and delamination following abrasion or flexing.

DETAILED DESCRIPTION OF INVENTION

Figure 1:
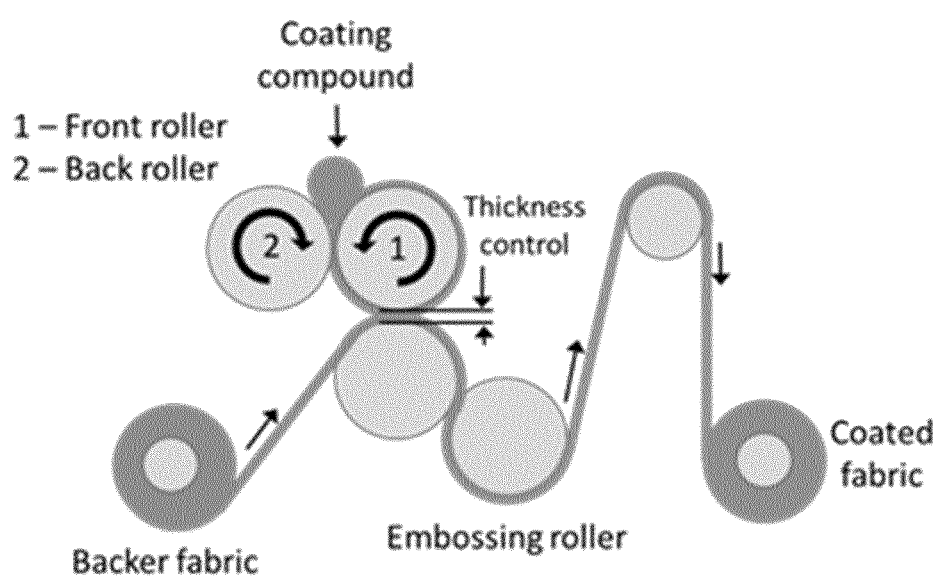
FIG. 1: Calendaring coating roller equipment

The flame retardant polyolefin compositions (X) used in the materials of the invention comprise an ethylene based plastomer and a propylene based plastomer, together with a flame retardant.

The term "ethylene based plastomer", as used herein, refers to a plastomer which comprises a majority amount of polymerized ethylene monomer (based on the weight of the plastomer) and, optionally, may contain at least one comonomer.

The term "propylene based plastomer", as used herein, refers to a plastomer which comprises a majority amount of polymerized propylene monomer (based on the weight of the plastomer) and, optionally, may contain at least one comonomer.

Where the term "comprising" is used in the present description and claims, it does not exclude other non-specified elements of major or minor functional importance. For the purposes of the present invention, the term "consisting of" is considered to be a preferred embodiment of the term "comprising".

Whenever the terms "including" or "having" are used, these terms are meant to be equivalent to "comprising" as defined above.

Ethylene Based Plastomer

The ethylene based plastomer (i) has a density in the range of 0.857 to 0.915 g/cm$^3$ and an MFR$_2$ (2.16 kg, 190° C.) in the range 0.5 to 30 g/10 min. It will be understood that by "ethylene-based" plastomer, we mean a plastomer in which the majority by weight derives from ethylene monomer units. Suitable ethylene-based plastomers may have an ethylene content from 60 to 95 wt %, preferably from 65 to 90 wt % and more preferably from 70 to 88 wt %. The comonomer contribution preferably is up to 40 wt %, more preferably up to 35 wt %. The comonomer contents of conventional ethylene plastomers are familiar to the person skilled in the art.

The ethylene based plastomer is preferably a copolymer of ethylene and propylene or a $C_4$-$C_{10}$ alpha-olefin. Suitable $C_4$-$C_{10}$ alpha-olefins include 1-butene, 1-hexene and 1-octene, preferably 1-butene or 1-octene and more preferably 1-octene. Ideally there is only one comonomer present. Preferably copolymers of ethylene and 1-octene are used.

The density of the ethylene-based plastomer is in the range of 0.857 to 0.915 g/cm$^3$, preferably in the range of 0.860 to 0.915 g/cm$^3$, more preferably 0.855 to 0.910 g/cm$^3$, such as 0.858-0.903 g/cm$^3$ or 0.865 to 0.905 g/cm$^3$, measured according to ISO 1183-1/A.

The MFR$_2$ (ISO 1133; 190° C.; 2.16 kg) of suitable ethylene based plastomers is in the range of 0.5 to 30 g/10 min, preferably in the range of 2.0 to 20 g/10 min and more preferably in the range of 5.0 to 15.0 g/min, even more preferably in the range of 2.5 to 12 g/10 min.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is 33 to 115° C.

Furthermore, suitable ethylene based plastomers may have a glass transition temperature Tg (measured with DMTA according to ISO 11357-2 of below −40° C., preferably below −54° C., more preferably below −58° C.

The ethylene based plastomer preferably has a molecular weight distribution (MWD), defined as weight average molecular weight divided by number average molecular weight (Mw/Mn), in the range of 1.5 to 5.0, more preferably in the range of 2.0 to 4.5, even more preferably in the range of 2.5 to 4.0.

The ethylene based plastomer can be unimodal or multimodal, preferably unimodal.

Preferably, the ethylene based plastomer is a metallocene catalysed polymer although Ziegler-Natta based polyethylene plastomers are also possible.

In one embodiment, the ethylene based plastomer is a thermoplastic plastomer.

Whilst it is within the ambit of the invention for a single ethylene based plastomer to be used, it is also possible for a mixture of two or more ethylene based plastomers as defined herein to be employed.

Suitable ethylene based plastomers can be any copolymer of ethylene and propylene or ethylene and $C_4$-$C_{10}$ alpha olefin having the above defined properties, which are commercially available, for example from Borealis AG (AT) under the tradename QUEO, from DOW Chemical Corp (USA) under the tradenames Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization processes at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar (1-10 MPa), preferably 15 to 100 bar (1.5-10 MPa) and more preferably 20 to 100 bar (2-10 MPa).

The liquid hydrocarbon solvent used is preferably a $C_5$-2-hydrocarbon which may be unsubstituted or substituted by a $C_{14}$ alkyl group, for example pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the Borceed technology.

It will be appreciated that the ethylene based plastomer may contain standard polymer additives.

The ethylene based plastomer may be virgin plastomer or may be recycled. For the purposes of the present description and the subsequent claims, the terms "recycled", "recycled waste" and "recyclate" are used to indicate material recovered from at least one of post-consumer waste and industrial waste. Post-consumer waste refers to objects having completed at least a first use cycle (or life cycle), i.e. having already served their first purpose, while industrial waste refers to the manufacturing scrap which does normally not reach a consumer.

"Recycled polymers" may also comprise up to 10 wt. %, preferably up to 5 wt. % and more preferably up to 1 wt. % based on the overall weight of the recycled polymer of other components originating from the first use. The type and amount of these components may influence the physical properties of the recycled polymer. Typical other components originating from the first use are constituents of lacquer such as polyurethanes.

The term "virgin" denotes newly produced materials and/or objects prior to first use and not being recycled. Where the origin of the materials herein is not explicitly mentioned the materials are "virgin" materials.

The ethylene based plastomer may be present in the composition (X) in the range 20 to 90 wt %, however typically it forms 30 to 90 wt % of the flame retardant polyolefin composition, wherein said wt % values are relative to the total weight of the composition as a whole. In a preferable embodiment, the ethylene based plastomer forms 35 to 75 wt %, such as 40 to 65 wt % (relative to the total weight of the composition as a whole) of the flame retardant polyolefin composition.

Propylene Based Plastomer

The flame retardant polyolefin compositions (X) used in the materials of the invention comprise a propylene based plastomer (ii) with a density in the range of 0.850 to 0.910 g/cm$^3$ and an MFR$_2$ (230° C./2.16 kg) in the range 0.01 to 30 g/10 min.

It is within the ambit of the invention for the composition to comprise only a single propylene based plastomer as defined herein. Alternatively, a mixture of at least two such propylene based plastomers may be employed. Additional propylene based plastomers with properties differing from those herein defined for "the propylene based plastomer" may also be employed in the compositions of the invention.

The propylene based plastomer of the invention is typically a copolymer of propylene and ethylene or a $C_4$-$C_{10}$ alpha-olefin, such as a copolymer of propylene with ethylene, butene, hexene or octene. It will be understood that propylene forms the major component in the propylene based plastomer. Propylene will typically be present in an amount of 55 to 95 wt % of the plastomer. If the comonomer is ethylene, the content of ethylene is preferably 5 to 30 wt %, such as 7.5 to 20 wt % in the propylene ethylene copolymer.

In all circumstances the propylene based plastomer has a density in the range of 0.850 to 0.910 g/cm$^3$, measured according to ISO 1183-1/A. In a preferable embodiment, the density of the propylene based plastomer is in the range of 0.855 to 0.900 g/cm$^3$ or 0.860 to 0.910 g/cm$^3$, preferably 0.863 to 0.905 g/cm$^3$, such as 0.865 to 0.900 g/cm$^3$.

Preferably, the propylene based plastomer has a MFR$_2$ (230° C., 2.16 kg) determined according to ISO 1133 in the range of 3.0 to 22 g/10 min.

The propylene based plastomer preferably has a molecular weight distribution (MWD), defined as weight average molecular weight divided by number average molecular weight (Mw/Mn) of 3.5 or less; or 3.0 or less; or from 1.8 to 3.0.

The weight average molecular weight (Mw) of the propylene based plastomers of this invention can vary widely, but typically it is between about 10,000 and 1,000,000 (with the understanding that the only limit on the minimum or the maximum Mw is that set by practical considerations).

The propylene based plastomer typically has a flexural modulus, when measured according to ISO 178, of less than 500 MPa, preferably less than 300, more preferably less than 200 MPa, such as less than 100 MPa. The flexural modulus of the propylene based plastomer is preferably at least 2 MPa, such as at least 5 MPa.

The propylene based plastomer used in the invention can be made by any process, and includes copolymers made by Ziegler-Natta, CGC (Constrained Geometry Catalyst), metallocene, and nonmetallocene, metal-centered, heteroaryl ligand catalysis. Propylene based plastomers of the invention are ideally formed using metallocene type catalysts.

The propylene based plastomer, in certain embodiments, is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

Propylene copolymers include random, block and graft copolymers although preferably the copolymers are of a random configuration. In one embodiment, the propylene based plastomer is preferably one which contains a random distribution of ethylene within the otherwise isotactic propylene chains. In can therefore be considered a random propylene ethylene copolymer. It is not however a heterophasic copolymer.

The propylene based plastomer may be virgin plastomer or may be recycled.

Propylene based plastomers of use in the invention are commercially available and can be bought from polymer suppliers. Examples include those available from The Dow Chemical Company, under the trade name VERSIFY, or from ExxonMobil Chemical Company, under the trade name VISTAMAXX.

The propylene based plastomer typically forms 5 to 45 wt % of the flame retardant polyolefin composition (X), wherein said wt % values are relative to the total weight of the composition as a whole. In a preferable embodiment, the propylene based plastomer forms 8 to 40 wt %, such as 10 to 35 wt % (relative to the total weight of the composition as a whole) of the flame retardant polyolefin composition.

Flame Retardant

The polyolefin composition (X) comprises a flame retardant. It will be understood that, in the context of the present invention, by "flame retardant" we mean a substance which is activated by the presence of an ignition source and which prevents or slows the further development of ignition by a variety of different physical and/or chemical methods.

Any suitable flame retardant known in the art may be employed. A single flame retardant may be employed or a mixture of two or more flame retardants can be used.

Exemplary flame retardants include boron phosphate flame retardants; magnesium oxide; dipentaerythritol; polytetrafluoroethylene (PTFE) polymers; phosphate ester flame retardants (e.g. Tricresyl phosphate); minerals such as aluminium hydroxide (ATH), magnesium hydroxide (MDH), huntite and hydromagnesite, antimony trioxide, alumina trihydrate, red phosphorus; boron compounds, e.g. borates; inorganic phosphinates and/or metal phosphinates such as salts of phosphinic acids and/or diphosphinic acids or polymeric derivatives thereof; organohalogen compounds such as organochlorines such as chlorendic acid derivatives and chlorinated paraffins; organobromines such as decabromodiphenyl ether (decaBDE), decabromodiphenyl ethane, polymeric brominated compounds such as brominated polystyrenes, brominated carbonate oligomers (BCOs), brominated epoxy oligomers (BEOs), decabromo diphenyl oxide, ethylene bis (tetrabromophthalimide), tetradecabromodiphenoxybenzene, ethylenebis (dibromonorbornanedi-carboximide), tetrabromophthalic anhydride, tetrabromobisphenol A (TBBPA) and hexabromocyclododecane (HBCD);

phosphate salt flame retardants such as metal salts of phosphoric acid, phosphorous acid, hypophosphorous acid, amine phosphate, melamine phosphate, dimelamine phosphate, melamine pyrophosphate, dimelamine pyrophosphate, ammonium polyphosphate, melamine polyphosphate, ethylenediamine phosphate, melamine nitrilotrisphosphonate or a combination thereof; organophosphorus compounds, in particular aromatic phosphates including monophosphates with aromatic groups, diphosphates with aromatic groups, triphosphates with aromatic groups, or any combination thereof. Other organophosphates include triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate.

In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis (2-chlorethyl)dichloroisopentyldiphosphate (V6).

Other known flame retardants which can be used include halogenated and/or melamine based flame retardants as well as those comprising ammonium polyphosphate.

Melamine derivatives include melamine polyphosphate, melamine pyrophosphate and melamine cyanurate, and mixtures of two or more of these materials. The halogenated flame retardants useful in the compositions of the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art.

The flame retardant will typically be present in an amount of about 1.5 to 30 wt %, preferably 2.0 to 30 wt %, more preferably 5.0 to 30 wt %, especially 10 to 30 wt %, such as 15 to 20 wt %, relative to the total weight of the flame retardant polyolefin composition (X) as a whole.

The flame retardant may be added neat or as part of a polymer masterbatch. A polymer masterbatch may contain the flame retardant in a concentration of, for example, about 2.5% to about 60% by weight.

Ideally, the flame retardant is halogen-free.

Preferably, the flame retardant comprises or is ammonium polyphosphate.

In a particularly preferable embodiment, the flame retardant comprises or is a mixture of an ammonium polyphosphate and a silane functionalised ethylene copolymer (S).

The weight ratio of the ammonium polyphosphate to the silane functionalised ethylene copolymer may be in the range 9:1 to 1:9, preferably 5:1 to 1:5, even more preferably 3:1 to 1:3, such as 1:1.

The ammonium polyphosphate may be any inorganic salt of polyphosphoric acid and ammonia. Ammonium polyphosphates are typically represented by the formula $[NH_4 PO_3]$. The chain length (n) of this polymeric compound is both variable and branched, and can be greater than 1000. Short and linear chain APPs (n<100) are more water sensitive (hydrolysis) and less thermally stable than longer chain APPs (n>1000), which show a very low water solubility (<0.1 g/100 ml).

Ammonium polyphosphates are stable, non-volatile compounds.

Ammonium polyphosphates for use in the flame retardants of the invention are commercially available and can be bought from many suppliers. Examples include the STAB FP-2000 series of flame retardants available from Adeka Polymer Additive Europe or IC FR5110 available from Into Chemicals.

The silane functionalised ethylene copolymer (S) is an ethylene copolymer comprising silane group(s) containing units. The silane group(s) containing units can be present as a comonomer of the ethylene copolymer or as a compound grafted chemically to the polymer.

Accordingly, in cases where the silane group(s) containing units are incorporated to the polymer (S) as a comonomer, the silane group(s) containing units are copolymerized as comonomer with ethylene monomer during the polymerization process of polymer (S). In case the silane group(s) containing units are incorporated to the polymer by grafting, the silane group(s) containing units are reacted chemically (also called as grafting) with the polymer after the polymerization of the polymer. The chemical reaction, i.e. grafting, is typically performed using a radical forming agent such as peroxide. Such chemical reaction may take place before or during the coating process of the invention. In general, copolymerization and grafting of the silane group(s) containing units to ethylene are well known techniques and well documented in the polymer field and within the skills of a skilled person. Example technologies include the Sioplas and Monosil processes.

In one embodiment, the silane functionalised ethylene copolymer (S) is preferably a polymer of ethylene which is selected from:
- (s1) a copolymer of ethylene and a silane group(s) containing comonomer;
- (s2) a copolymer of ethylene with one or more polar comonomer(s) selected from $(C_1-C_6)$-alkyl acrylate or $(C_1-C_6)$-alkyl $(C_1-C_6)$-alkylacrylate comonomer(s), which copolymer (s2) bears silane group(s) containing units and which copolymer (s2) is different from the polymer of ethylene (s1); or
- (s3) a copolymer of ethylene with one or more $(C_3-C_{10})$-alpha-olefin comonomers which is different from polymer of ethylene (s1) and polymer of ethylene (s2) and to which silane group(s) containing units have been grafted.

It is well known that the use of peroxide in the grafting embodiment decreases the melt flow rate (MFR) of an ethylene polymer due to a simultaneous crosslinking reaction. As a result, the grafting embodiment can bring limitations to the choice of the MFR of polymer (S) as a starting polymer, which choice of MFR can have an adverse impact on the quality of the polymer at the end use application. Furthermore, the by-products formed from peroxide during the grafting process can have an adverse impact on use life of the polymer composition at end use application.

The copolymerization of the silane group(s) containing comonomer into the polymer backbone provides more uniform incorporation of the units compared to grafting of the units. Moreover, compared to grafting, the copolymerization does not require the addition of peroxide after the polymer is produced.

Accordingly, the silane group(s) containing units are preferably present in polymer (S) as a comonomer, i.e. incorporated to the polymer (s1) as a comonomer with the ethylene monomer, and in case of the polymer (s2), as a comonomer together with the polar comonomer and ethylene monomer. Polymer (s2) thus contains two different comonomers, the silane group(s) containing comonomer and the polar comonomer, as hereinbefore defined, i.e. the polymer (s2) is a terpolymer. It will be understood, however, that in polymer (s2), the silane group(s) containing units may also be present as units which have been grafted to a copolymer of ethylene and the one or more polar comonomer(s).

"Silane group(s) containing comonomer" means herein above, below or in claims that the silane group(s) containing units are present as a comonomer.

The silane group(s) containing unit or, preferably, the silane group(s) containing comonomer, of polymer of ethylene (S), is preferably a hydrolysable unsaturated silane compound represented by the formula (I):

$$R^1 SiR^2_q Y_{3-q} \qquad (I)$$

wherein
R$^1$ is an ethylenically unsaturated hydrocarbyl, hydrocarbyloxy or (meth)acryloxy hydrocarbyl group,
each R$^2$ is independently an aliphatic saturated hydrocarbyl group,
Y which may be the same or different, is a hydrolysable organic group and
q is 0, 1 or 2;

Further suitable silane group(s) containing comonomer is e.g. gamma-(meth)acryl-oxypropyl trimethoxysilane, gamma(meth)acryloxypropyl triethoxysilane, and vinyl triacetoxysilane, or combinations of two or more thereof.

One suitable subgroup of compound of formula (I) is an unsaturated silane compound or, preferably, comonomer of formula (II)

$$CH_2 = CHSi(OA)_3 \qquad (II)$$

wherein each A is independently a hydrocarbyl group having 1-8 carbon atoms, suitably 1-4 carbon atoms.

The silane group(s) containing unit, or preferably, the comonomer, of the invention, is preferably the compound of formula (II) which is vinyl trimethoxysilane, vinyl bismethoxyethoxysilane, vinyl triethoxysilane, more preferably vinyl trimethoxysilane or vinyl triethoxysilane, more preferably vinyl trimethoxysilane.

The amount (mol %) of the silane group(s) containing units present, preferably present as comonomer, in the polymer (S) is preferably of 0.01 to 2.0 mol %, preferably 0.01 to 1.00 mol %, suitably from 0.05 to 0.80 mol %, suitably from 0.10 to 0.60 mol %, suitably from 0.10 to 0.50 mol %, when determined according to "Comonomer contents" as described below under "Determination Methods".

In one embodiment, the polymer (S) is a polymer of ethylene which bears silane group(s) containing comonomer. In this embodiment, the polymer (s1) does not contain, i.e. is without, a polar comonomer as defined for polymer (s2). Preferably the silane group(s) containing comonomer is the sole comonomer present in the polymer (s1). Accordingly, the polymer (s1) is preferably produced by copolymerizing ethylene monomer in a high pressure polymerization process in the presence of silane group(s) containing comonomer using a radical initiator.

Preferably the silane group(s) containing comonomer is the only comonomer present in the polymer of ethylene (s1).

In this embodiment, the polymer (s1) is preferably a copolymer of ethylene with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Most preferably the polymer (s1) is a copolymer of ethylene with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer, most preferably vinyl trimethoxysilane comonomer.

In another embodiment, the polymer (S) is a polymer of ethylene with one or more polar comonomer(s) selected from (C$_1$-C$_6$)-alkyl acrylate or (C$_1$-C$_6$)-alkyl (C$_1$-C$_6$)-alkylacrylate comonomer(s) (s2), which copolymer (s2) bears silane group(s) containing units. In this embodiment, the polymer (s2) is a copolymer of ethylene with one or more, preferably one, polar comonomer(s) selected from (C$_1$-C$_6$)-alkyl acrylate or (C$_1$-C$_6$)-alkyl (C$_1$-C$_6$)-alkylacrylate comonomer(s) and silane group(s) containing comonomer. Preferably, the polar comonomer of the polymer of ethylene (s2) is selected from one of (C$_1$-C$_6$)-alkyl acrylate comonomer, preferably from methyl acrylate, ethyl acrylate or butyl acrylate comonomer. More preferably, the polymer (s2) is a copolymer of ethylene with a polar comonomer selected from methyl acrylate, ethyl acrylate or butyl acrylate comonomer and with silane group(s) containing comonomer. The polymer (s2) is most preferably a copolymer of ethylene with a polar comonomer selected from methyl acrylate, ethyl acrylate or butyl acrylate comonomer and with silane group(s) containing comonomer of compound of formula (I). Preferably, in this embodiment the polar comonomer and the preferable silane group(s) containing comonomer are the only comonomers present in the copolymer of ethylene (s2).

The content of the polar comonomer present in the polymer (s2) is preferably of 0.5 to 30.0 mol %, 2.5 to 20.0 mol %, preferably of 4.5 to 18 mol %, preferably of 5.0 to 18.0 mol %, preferably of 6.0 to 18.0 mol %, preferably of 6.0 to 16.5 mol %, more preferably of 6.8 to 15.0 mol %, more preferably of 7.0 to 13.5 mol %, when measured according to "Comonomer contents" as described below under the "Determination methods".

In this embodiment, the polymer (s2) is preferably a copolymer of ethylene with the polar comonomer, as defined above or below, and with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Preferably the polymer (s2) is a copolymer of ethylene with methyl acrylate, ethyl acrylate or butyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer. More preferably the polymer sa2) is a copolymer of ethylene with methyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer.

Accordingly, the polymer (s2) is most preferably a copolymer of ethylene with methyl acrylate comonomer together with silane group(s) containing comonomer as defined above, more preferably a copolymer of ethylene with methyl acrylate comonomer and with vinyl trimethoxysilane or vinyl triethoxysilane comonomer, preferably with methyl acrylate comonomer and with vinyl trimethoxysilane comonomer.

Without binding to any theory, methyl acrylate (MA) is the only acrylate which cannot go through the ester pyrolysis reaction, since does not have this reaction path. Therefore, the polymer (s2) with MA comonomer does not form any harmful free acid (acrylic acid) degradation products at high temperatures, whereby polymer (s2) of ethylene and methyl acrylate comonomer contribute to good quality and life cycle of the end article thereof. This is not the case e.g. with vinyl acetate units of EVA, since EVA forms at high temperatures harmful acetic acid degradation products. Moreover, the other acrylates like ethyl acrylate (EA) or butyl acrylate (BA) can go through the ester pyrolysis reaction, and if they degrade, could form volatile olefinic by-products.

In another embodiment, the polymer (S) is the polymer (s3) which is a copolymer of ethylene with one or more $(C_3\text{-}C_{10})$-alpha-olefin comonomer which is different from polymer of ethylene (s1) and polymer of ethylene (s2) and to which silane group(s) containing units have been grafted. Preferably, polymer (s3) is a polymer of ethylene with one or more, preferably one, comonomer(s) selected from $(C_3\text{-}C_8)$-alpha-olefin comonomer. In such embodiments, the polymer (s3) may be further defined by any of the embodiments described above for the ethylene based plastomer.

Most preferably the polymer (S) is selected from polymer (s1) or (s2).

The melt flow rate, $MFR_2$, of polymer (S), is preferably less than 20 g/10 min, preferably less than 15 g/10 min, preferably from 0.1 to 13 g/10 min, preferably from 0.2 to 10 g/10 min, preferably from 0.3 to 8 g/10 min, more preferably from 0.4 to 6, g/10 min (according to ISO 1133 at 190° C. and at a load of 2.16 kg).

The polymer (S) preferably has a melting temperature of 120° C. or less, preferably 110° C. or less, more preferably 100° C. or less and most preferably 95° C. or less, when measured according to ASTM D3418. Preferably the melting temperature of the polymer (S) is 70° C. or more, more preferably 75° C. or more, even more preferably 78° C. or more.

Typically, the density of the polymer of ethylene (S) is higher than 855 kg/m$^3$. Preferably the density is not higher than 970 kg/m$^3$, and preferably is from 920 to 960 kg/m$^3$, according to ISO 1183:1987.

Preferred polymer (S) is a polymer of ethylene (s1) with vinyl trimethoxysilane comonomer or a copolymer of ethylene (s2) with methylacrylate comonomer and with vinyl trimethoxysilane comonomer. The most preferred polymer (S) is a copolymer of ethylene (s2) with methylacrylate comonomer and with vinyl trimethoxysilane comonomer.

The polymer (S) of the composition can be e.g. commercially available or can be prepared according to or analogously to known polymerization processes described in the chemical literature.

In a preferable embodiment the polymer (S), i.e. polymer (s1) or (s2), is produced by polymerizing ethylene suitably with silane group(s) containing comonomer (=silane group(s) containing units present as comonomer) as defined above, and in case of polymer (s2) also with the polar comonomer(s), in a high pressure (HP) process using free radical polymerization in the presence of one or more initiator(s) and optionally using a chain transfer agent (CTA) to control the MFR of the polymer. The HP reactor can be e.g. a well-known tubular or autoclave reactor or a mixture thereof, suitably a tubular reactor. The high pressure (HP) polymerization and the adjustment of process conditions for further tailoring the other properties of the polymer, depending on the desired end application, are well known and described in the literature, and can readily be used by a skilled person. Suitable polymerization temperatures range up to 400° C., suitably from 80 to 350° C. and pressure from 70 MPa, suitably 100 to 400 MPa, suitably from 100 to 350 MPa. The high pressure polymerization is generally performed at pressures of 100 to 400 MPa and at temperatures of 80 to 350° C. Such processes are well known and well documented in the literature and will be further described later below.

The incorporation of the comonomer(s), when present, including the preferred form of silane group(s) containing units as comonomer, to the ethylene monomer and the control of the comonomer feed to obtain the desired final content of said comonomer(s) can be carried out in a well-known manner and is within the skills of a skilled person.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mahling pp. 7181-7184.

Such HP polymerization results in a so called low density polymer of ethylene (LDPE), herein results in polymer (s1) or polymer (s2). The term LDPE has a well-known meaning in the polymer field and describes the nature of polyethylene produced in HP, i.e. the typical features, such as different branching architecture, to distinguish the LDPE from PE produced in the presence of an olefin polymerization catalyst (also known as a coordination catalyst). Although the term LDPE is an abbreviation for low density polyethylene, the term is understood not to limit the density range, but covers the LDPE-like HP polyethylenes with low, medium and higher densities.

The polymer (s3) can be commercially available or be produced in a polymerization process using a coordination catalyst, typically Ziegler-Natta or single site catalyst, as well documented in the literature. The choice of the process, process conditions and the catalyst is within the skills of a skilled person. Alternatively, the polymer (s3) may be prepared by a method as described above for the ethylene based plastomer.

Flame Retardant Composition (X)

It will be understood that, in addition to the ethylene-based plastomer and the propylene based plastomer, the flame retardant polyolefin composition (X) may comprise further polymeric components. These may be added to enhance the properties of the composition.

Examples of additional polymers include ethylene, propylene or butylene based polymers and copolymers, ethylene acrylic copolymers, ethylene acrylic ester copolymers and rubbers such as silicone rubber, nitrile butadiene rubber and butyl rubber. It is preferred if any additional polymers do not contain chlorine, i.e. the composition is free of chlorine containing polymers.

Typically, additional polymeric components are added in amount of 0.5 to 20 wt %, such as 1 to 10 wt %, e.g. 3 wt % relative to the total weight of the composition as a whole.

"Polymeric component(s)" exclude herein any carrier polymer(s) of the flame retardant and/or optional additive(s), e.g. carrier polymer(s) used in master batch(es) of the flame retardant or additive(s) optionally present in the composition.

In one preferable embodiment, in addition to the ethylene-based plastomer and the propylene based plastomer as hereinbefore defined, the composition further comprises a high melt flow rate propylene based plastomer. By "high melt flow rate" we typically mean an MFR$_2$ (230° C.) of greater than 5000 g/10 min, such as greater than 7000 g/10 min.

The high melt flow rate propylene based plastomer of the invention is typically a copolymer of propylene and ethylene or a C$_4$-C$_{10}$ alpha-olefin, most preferably a copolymer of propylene with ethylene. It will be understood that propylene forms the major component in the high melt flow rate propylene based plastomer. Propylene will typically be present in an amount of 55 to 95 wt % of the polymer. Where ethylene is the comonomer, the content of ethylene is preferably 5 to 30 wt %, such as 7.5 to 20 wt %.

In all circumstances the high melt flow rate propylene based plastomer preferably has a density in the range of 0.850 to 0.910 g/cm$^3$, preferably 0.855 to 0.910 g/cm$^3$ and more preferably 0.860 to 0.910 g/cm$^3$. In a preferable embodiment, the density of the high melt flow rate propylene based plastomer is 0.865 to 0.905 g/cm$^3$, such as 0.870 to 0.900 g/cm$^3$.

The high melt flow rate plastomer is preferably one which contains random distribution of ethylene with the otherwise isotactic propylene chains. It can therefore be considered a random propylene ethylene copolymer. Example commercially available high melt flow rate propylene based plastomers include VISTAMAXX 8880 of ExxonMobil.

Without wishing to be bound by theory, the high melt flow rate propylene based plastomer is thought to act as a compatibiliser, helping to generate a more homogenous composition.

In another embodiment, the composition of the invention further comprises a copolymer of propylene which is different to the propylene based plastomer and the high melt flow rate propylene based plastomer as hereinbefore defined. Such a copolymer may be a copolymer of propylene and ethylene or a C$_4$-C$_{10}$ alpha-olefin.

In one embodiment, this propylene copolymer can be a heterophasic propylene copolymer comprising a matrix (M) being a random propylene copolymer (R-PP) and an elastomeric propylene copolymer (E) dispersed in said matrix (M).

The heterophasic propylene copolymer typically comprises 60.0 to 85.0 wt. %, based on the total weight of the heterophasic propylene copolymer, of the random propylene copolymer (R-PP) and 15.0 to 40.0 wt. %, based on the total weight of the heterophasic propylene copolymer, of the elastomeric propylene copolymer (E). The comonomers of the random propylene copolymer (R-PP) and/or the comonomers of the elastomeric propylene copolymer (E) may be ethylene and/or C4 to C8 α-olefins. Suitable commercially available heterophasic propylene copolymers comprising a propylene random copolymer as matrix phase include Bormed™ SC876CF available from *Borealis* Polyolefine GmbH (Austria).

The compositions used in the invention may be prepared by any suitable method. Ideally, a method is used which produces a homogenous mixture of the various components. Typically, compounding is employed. Compounding usually involves mixing or/and blending the various components in a molten state, often by extrusion. Such methods will be well known to the person skilled in the art.

Additives

It will be appreciated that one or more additives known in the art of polymer processing can also be included in the compositions (X). Suitable additives include slip agents, anti-acids, anti-microbials, antiblock agents, silicon-based anti-scratch agents, fillers; lubricants; processing aids; anti-oxidants, for example, phenolic antioxidants such as RICHFOS 168 marketed by TriConor or Irgafos 168 FF marketed by BASF which are tris(2,4-di-tertbutylph nyl) pbosphite, KINOX-34 marketed by HPL Additivies Ltd. which is L3,5-tris (3,5-di-tert-butyl-4-hydroxybenzyl)-1,3, 5-triazine-2,4,6-(11H,3H,5H)-trione, Lowinox TBM-6 marketed by Addivant and IRGANOX 1010 which is pentaerythritol tetrakis (3-(3,5-di-tert-butyl-4-hydroxyphenyl) propionate or IRGANOX 1035 which is octadecyl-3-(3,5-di-tert-butyl-4-hydroxyphenyl)-propionate marketed by BASF or aminic antioxidants such as Vulcanox HS and Flectol H which are polymerized 2,2,4-trimethyl-1,2-dihydroquinoline; metal deactivators and/or copper inhibitors, for example, hydrazides such as oxalic acid benzoyl hydrazide (OABH) or Irganox 1024 which is 2',3-bis-[[3-(3,5-di-tert-butyl-4-hydroxyphenyl)proponyl]]propiono hydrazide; UV absorbers, for example Tinuvin or HALS type UV absorbers; light stabilisers, for example polymeric hindered amine light stabilisers (HLAS) such as SABO® STAB UV 94 (1,6-hexanediamine, N,N'-bis(2,2,6,6-tetramethyl-4-piperidinyl)-, polymer with 2,4,6-trichlor-1,3,5-triazine, reaction products with 2,4,4-trimethyl-2-pentanamine); nucleating agents; foaming or blowing agents which may be either endothermic or exothermic for example, p,p'-oxybis(benzene-sulfonyl-hydrazide), azo-isobutyro-nitrile and azodicarbonamide; processing and/or thermal stabilisers, for example tris(2,4-ditertbutylphenyl) phosphite (phosphite based), pentaerythritol tetrakis(3-(3,5-di-tertbutyl-4-hydroxyphenyl) propionate), octadecyl-3-(3,5-di-tert-butyl-4-hydroxyphenyl) propionate, 3,3',3",5,5',5"-hexa-tert-butyl-a,a',a"-(mesitylene-2,4,6-triyl)tri-p-cresol (phenolic based) and dioctadecyl-3,3'-thiodipropionate (thioester based); and pigments, for example, inorganic pigments such as titanium dioxide and carbon black and organic pigments.

The additives may be present in amounts in the range of 0.1 to 10 wt %, preferably 0.5 to 10 wt %, more preferably in 0.5 to 3 wt. %, relative to the total weight of the composition (X) as a whole.

In all embodiments, it is preferred if the composition is halogen free, i.e. it does not contain any component which comprise halogens, especially chlorine.

In one embodiment of the invention, the coating (e.g. the composition (X)) does not comprise a filler.

In one preferred embodiment, the flame retardant polyolefin composition (X) comprises:
 a flame retardant (FR);
 A) 5 to 35 wt. %, based on the overall weight of the flame retardant polyolefin composition (X), of a recycled polyolefin fabric substrate; wherein said fabric substrate is coated with a polymer composition (p1) comprising the following components:
  a1) an ethylene based plastomer with a density in the range of 0.857 to 0.915 g/cm$^3$ and a MFR$_2$ (190° C., 2.16 kg) in the range of 0.5 to 30 g/10 min; and
  a2) a propylene based plastomer in the range of 0.850 to 0.910 g/cm$^3$ and a MFR$_2$ (230° C., 2.16 kg) in the range of 0.01 to 30 g/10 min;
 B) 65 to 95 wt. %, based on the overall weight of the flame retardant polyolefin composition (X), of a homopolypropylene or a recycled polymer blend comprising b1) polypropylene and b2) polyethylene, wherein the weight ratio of b1) to b2) is from 3:7 to 12:1; and optionally
 C) one or more additives;

with the proviso that the amounts of the flame retardant (FR), components A), B), and C) (if present), add up to 100 wt. %.

The polyolefin compositions (X) in accordance with this embodiment comprise a flame retardant, the components A) and B) and optionally additives C). The requirement applies here that the flame retardant, components A) and B) and, if present, the additives C), add up to 100 wt. % in total, based on the weight of the composition (X). The ranges for the amounts of the flame retardant and the individual components A) and B) and optionally the additives C) are to be understood such that an amount for each of the individual components can be selected within the specified ranges provided that the provision is satisfied that the sum of all the flame retardant, components A) and B) and optionally the additives C), add up to 100 wt. %.

Component A)

Component A) in accordance with this embodiment is a recycled polyolefin fabric substrate coated with a specific polyolefin composition comprising the components specified below.

Component A) according to the present invention comprises components a1), a2) and optionally component a3) (as defined hereafter). The requirement applies here that components a1), a2), and if present component a3), add up to 100 wt. %, based on the total weight of polymer composition (p1). The fixed ranges of the indications of quantity for the individual components a1), a2) and optionally a3) are to be understood such that an arbitrary quantity for each of the individual components can be selected within the specified ranges provided that the strict provision is satisfied that the sum of all the components a1), a2) and optionally a3) add up to 100 wt. %.

According to a preferred embodiment, the content of the coating composition (p1) in component A) is in the range of 5 to 90 wt. %, preferably in the range of 50 to 85 wt. %, more preferably in the range of 55 to 75 wt. % and even more preferably in the range of 60 to 70 wt. % based on the overall weight of component A).

As used herein, a "polyolefin fabric substrate" is a fabric substrate which comprises a majority amount of polyolefins (based on the weight of the fabric substrate). Preferably the fabric substrate in component A) comprises polypropylene and more preferably the substrate consists of polypropylene.

The material used as starting for material for component A) may be a nonwoven material. Alternatively, the fabric substrate used as starting material for component A) is a woven or knitted fabric, such as a polypropylene knitted fabric.

Besides the coating composition as defined herein, the polyolefin fabric substrate used as starting for material for component A) may be further coated with one or more additional materials, such as a lacquer (e.g. a polyurethane lacquer) to modify the surface properties of the polyolefin coated fabric. According to a preferred embodiment of the present invention, the content of the lacquer is below 15 wt. %, preferably in the range of 0.2 to 5 wt. % and more preferably in the range of 0.4 to 2 wt. % based on the overall weight of component A).

In general the polyolefin fabric substrate can be recycled by any mechanical recycling process known in the art to obtain component A). Preferably said process provides component A) in shredded form, as pellets, as flakes, as powder or as granules.

For example, recycled material may be shredded using a Wittmann mill. Another preferred method for recycling the polyolefin fabric substrate is using the Erema Pure Loop system. In this system the fabrics as such (like sheets) are conveyed with a belt to a shredding chamber. The fabrics are then shredded into small pieces, followed by a direct feeding to the extruder for melting, homogenising, and filtering before being pelletized under water. Granules are then collected and ready for further use, i.e. compounding.

The discussion of the ethylene based plastomer (i) above applies equally to the ethylene based plastomer a1). Similarly, the discussion of the propylene based plastomer (ii) above applies equally to the propylene based plastomer a2) According to a further preferred embodiment of the present invention the content of component a1) in the coating composition of component A) is in the range of 40 to 65 wt. %, preferably in the range of 45 to 62 wt. % and more preferably in the range of 52 to 60 wt. % based on the overall weight of the coating composition of component A).

In a preferred embodiment of the present invention the content of component a2) in the coating composition of component A) is in the range of 20 to 40 wt. %, preferably in the range of 29 to 39 wt. % and more preferably in the range of 30 to 34 wt. % based on the overall weight of the coating composition of component A).

Component A) according to this embodiment may optionally comprise a flame retardant a3). It is not only possible to use a single flame retardant, but it is also possible to use a mixture of two or more flame retardant. The flame retardant a3) may be any of the flame retardants discussed above, and may be the same or different to the flame retardant (FR) Preferably, it comprises or consists of an ammonium polyphosphate.

The content of component A) in the polyolefin composition (X) is preferably in the range of 9 to 31 wt. %, more preferably in the range of 10 to 20 wt. % and even more preferably in the range of 19 to 31 wt. % based on the overall weight of the composition.

Component B)

Component B) in accordance with this embodiment is a homopolypropylene or a recycled polymer blend comprising b1) polypropylene and b2) polyethylene, wherein the weight ratio of b1) to b2) is from 3:7 to 12:1.

According to a preferred embodiment, component B) is a homopolypropylene having a $MFR_2$ (230° C., 2.16 kg) determined according to ISO 1133 in the range of 10 to 30 g/10 min, preferably 15 to 25 g/10 min and more preferably in the range of 18 to 22 g/10 min.

Suitable homopolypropylenes are those which have a melting point determined according to IO 11357-3 in the range of 158 to 163° C. and preferably in the range of 160 to 162° C.

Preferred homopolypropylenes are commercially available from *Borealis* AG (Austria) under the trade names HE370FB, HG475FB, HH450FB and HF420FB.

In another preferred embodiment, component B) is a recycled polymer blend comprising b1) polypropylene and b2) polyethylene, wherein the weight ratio of b1) to b2) is from 3:7 to 12:1. Preferably, component B) is a recycled polymer blend comprising 80.0 to 99.9 wt. %, preferably 90.0 to 99.0 wt. % and more preferably 94.0 to 98.0 wt. %, based on the overall weight of component B), of polypropylene b1) and polyethylene b2).

The recycled polymer blend may contain up to 17 wt.-%, preferably up to 3 wt.-%, more preferably up to 1 wt.-% and even more preferably up to 0.1 wt.-% based on the overall weight of the recycled polymer of other components originating from the first use Typical other components originating from the first use of the "recycled polymer blend" are thermoplastic polymers, like polystyrene (PS) and polyamide 6 (PA 6), talc, chalk, ink, wood, paper, limonene and fatty acids. The content of polystyrene and PA 6 in "recycled polymer blends" can be determined by Fourier Transform Infrared Spectroscopy (FTIR) and the content of talc, chalk, wood and paper may be measured by Thermogravimetric Analysis (TGA).

Preferably, when component B) is a recycled polymer blend, it comprises less than 5 wt. %, preferably less than 3 wt. % and more preferably from 0.01 to 2 wt. % based on the overall weight of component B) of thermoplastic polymers different from b1) and b2). For example, component B) is preferably a recycled polymer blend comprising less than 4.0 wt. % polyamide 6 (PA 6) and less than 5 wt. % polystryrene, more preferably 0.5 to 3 wt. % polystyrene.

Also preferably, component B) is a recycled polymer blend having a MFR2 (230° C., 2.16 kg) determined according to ISO 1133 in the range of 16 to 50 g/10 min and preferably in the range of 18 to 22 g/10 min.

The recycled polymer blend preferably originates from post-consumer and/or post-industrial waste, which can be derived from inter alia waste electrical and electronic equipment (WEEE) or end-of-life vehicles (ELV) or from differentiated waste collection schemes like the German DSD system, the Austrian ARA system and the Austrian ASZ system (especially for Purpolen materials) or the Italian "Raccolta Differenziata" system.

Recycled materials are commercially available, e.g. from Corpela (Italian Consortium for the collection, recovery, recycling of packaging plastic wastes), Resource Plastics Corp. (Brampton, ON), Kruschitz GmbH, Plastics and Recycling (AT), Ecoplast (AT), Vogt Plastik GmbH (DE), mtm plastics GmbH (DE) etc.

A preferred recycled polymer blend is Purpolen PP, being a recycled polymer mixture comprising polyethylene and polypropylene obtained from mtm plastics GmbH, Niedergebra, Germany.

The content of component B) in the polyolefin composition (X) is preferably in the range of 69 to 91 wt. %, more preferably in the range of 80 to 90 wt. % and even more preferably based in the range of 69 to 81 wt. % based on the overall weight of the composition.

Component C)

The polyolefin composition (X) of this embodiment may comprise one or more additives as described above. These additives are preferably present in 0.1 to 10 wt. % and more preferably in 0.5 to 3 wt. % based on the overall weight of the composition.

A preferred polyolefin composition (X) for use in the present invention comprises the following components:
a flame retardant (FR):
A) 5 to 35 wt. % of a recycled polyolefin fabric substrate; wherein said fabric substrate is coated with a polymer composition comprising the following components:
 a1) an ethylene based plastomer with a density determined according to ISO 1183-1 in the range of 0.860 to 0.915 g/cm³ and a MFR$_2$ (190° C., 2.16 kg) determined according to ISO 1133 in the range of 0.5 to 30 g/10 min; and
 a2) a propylene based plastomer with a density determined according to ISO 1183-1 in the range of 0.850 to 0.910 g/cm³ and a MFR$_2$ (230° C., 2.16 kg) determined according to ISO 1133 in the range of 0.01 to 30 g/10 min;
 a3) a flame retardant, preferably an ammonium polyphosphate;

B) 65 to 95 wt. % of a homopolypropylene or a recycled polymer blend comprising b1) polypropylene and b2) polyethylene, wherein the weight ratio of b1) to b2) is from 3:7 to 12:1;
with the proviso that the amounts of the flame retardant (FR) and components A) and B) add up to 100 wt. %.
The flame retardant (FR) and the flame retardant a3) may be the same or different.

Another preferred polyolefin composition (X) for use according to the present invention comprises the following components:
a flame retardant (FR)I;
A) 9 to 31 wt. %, preferably 19 to 31 wt. %, of a recycled polyolefin fabric substrate; wherein said fabric substrate is coated with a polymer composition comprising the following components:
 a1) 40 to 65 wt. %, preferably 45 to 62 wt. % and more preferably 52 to 60 wt. %, based on the overall weight of the polymer composition of an ethylene based plastomer with a density determined according to ISO 1183-1 in the range of 0.865 to 0.905 g/cm³ and a MFR$_2$ (190° C., 2.16 kg) determined according to ISO 1133 in the range of 2.5 to 12 g/10 min;
 a2) 20 to 40 wt. %, preferably 29 to 39 wt. %, more preferably 30 to 34 wt. %, based on the overall weight of of the polymer composition of a propylene based plastomer with a density determined according to ISO 1183-1 in the range of 0.855 to 0.900 g/cm³ and a MFR$_2$ (230° C., 2.16 kg) determined according to ISO 1133 in the range of 3 to 22 g/10 min; and
 a3) 5 to 20 wt. %, preferably 9 to 16 wt. % and more preferably 10 to 14 wt. % based on the overall weight of the polymer composition of a flame retardant, preferably an ammonium polyphosphate;
wherein components a1) to a3) add up to 100 wt. %;
B) 69 to 91 wt. %, preferably 69 to 81 wt. %, of a homopolypropylene or a recycled polymer blend comprising b1) polypropylene and b2) polyethylene, wherein the weight ratio of b1) to b2) is from 3:7 to 12:1;
with the proviso that the amounts of the flame retardant (FR) and components A) and B) add up to 100 wt. %.
The flame retardant (FR) and the flame retardant a3) may be the same or different.

In another preferred embodiment, the flame retardant polyolefin composition (X) comprises the following components:
a flame retardant (FR);
A1) 5 to 35 wt. %, based on the overall weight of the flame retardant polyolefin composition (X), of a recycled polyolefin fabric substrate; wherein said fabric substrate is coated with a polymer composition (p2) comprising the following components:
 a11) an ethylene based plastomer with a density in the range of 0.857 to 0.915 g/cm³ and a MFR$_2$ (190° C., 2.16 kg) in the range of 0.5 to 30 g/10 min; and
 a12) a propylene based plastomer in the range of 0.850 to 0.910 g/cm³ and a MFR$_2$ (230° C., 2.16 kg) in the range of 0.01 to 30 g/10 min;
B1) 65 to 95 wt. % based on the overall weight of the flame retardant polyolefin composition (X) of a virgin polyolefin composition (p3) comprising the following components:

b11) an ethylene based plastomer with a density in the range of 0.857 to 0.915 g/cm³ and a MFR₂ (190° C., 2.16 kg) in the range of 0.5 to 30 g/10 min; and b12) a propylene based plastomer with a density in the range of 0.850 to 0.910 g/cm³ and a MFR₂ (230° C., 2.16 kg) in the range of 0.01 to 30 g/10 min;

and optionally

C1) one or more additives;

with the proviso that the amounts of the flame retardant (FR), components A1) and B1), and C1) if present, add up to 100 wt. %.

The polyolefin compositions (X) in accordance with this embodiment comprise a flame retardant, the components A1) and B1) and optionally additives C1). The requirement applies here that the flame retardant and components A1) and B1) and, if present, the additives C1), add up to 100 wt. % in total, based on the weight of the composition (X). The ranges for the amounts of the flame retardant (FR), the individual components A1) and B1) and optionally the additives C1) are to be understood such that an amount for each of the individual components can be selected within the specified ranges provided that the provision is satisfied that the sum of all the components (FR), A1), B1) and optionally the additives C1), add up to 100 wt. %.

Component A1)

Component A1) of the above preferred composition for use to the present invention is a recycled polyolefin fabric substrate coated with a specific polyolefin composition.

Component A1) according to the present invention comprises components a11), a12) and optionally component a13) (as defined below). The requirement applies here that components a11), a12), and if present component a13), add up to 100 wt. %. This means that when only components a11) and a12) are present these components add up to 100 wt. %. The fixed ranges of the indications of quantity for the individual components a11), a12) and optionally a13) are to be understood such that an arbitrary quantity for each of the individual components can be selected within the specified ranges provided that the strict provision is satisfied that the sum of all the components a11), a12) and optionally a13) add up to 100 wt. %.

The discussion of the ethylene based plastomer (i) above applies equally to the ethylene based plastomer a11). Similarly, the discussion of the propylene based plastomer (ii) above applies equally to the propylene based plastomer a12) The discussion of the polyolefin substrate above in component A) applies equally to the polyolefin substrate in component A1).

Component A1) may optionally comprise a flame retardant a13). A single flame retardant may be used, but it is also possible to use a mixture of two or more flame retardants. The flame retardant a13) may be any of the flame retardants discussed above, and may be the same or different to the flame retardant (FR). Preferably, it comprises or consists of an ammonium polyphosphate. The content of component a3) in the coating composition of component A) may be in the range of 5 to 20 wt. %, preferably in the range of 9 to 16 wt. % and more preferably in the range of 10 to 14 wt. % based on the overall weight of the coating composition of component A1).

Preferably, the content of component A1) in the composition (X) is in the range of 9 to 31 wt. % and more preferably in the range of 10 to 20 wt. % based on the overall weight of the composition.

Component B1)

According to another embodiment of the present invention the content of component B1) in the composition (X) is in the range of 69 to 91 wt. % and preferably in the range of 80 to 90 wt. % based on the overall weight of the composition.

The discussion of the ethylene based plastomer (i) above applies equally to the ethylene based plastomer b11). Similarly, the discussion of the propylene based plastomer (ii) above applies equally to the propylene based plastomer b12) Component B1) may optionally comprise a flame retardant b13), wherein the flame retardant is as defined above. The flame retardant in component B1) can be the same or can be different to flame retardant (FR) and to that in component A1), if present, and preferably it is the same. It is possible to use a single flame retardant, but it is also possible to use a mixture of two or more flame retardants as defined herein.

A preferred polyolefin composition (X) for use according to the present invention comprises the following components:

a flame retardant (FR);

A1) 5 to 35 wt. % of a recycled polyolefin fabric substrate; wherein said fabric substrate is coated with a polymer composition (p2) comprising the following components:

a11) 40 to 65 wt. %, preferably 45 to 62 wt. % and more preferably 52 to 60 wt. %, based on the overall weight of polymer composition (p2) of an ethylene based plastomer with a density determined according to ISO 1183-1 in the range of 0.860 to 0.915 g/cm³ and a MFR₂ (190° C., 2.16 kg) determined according to ISO 1133 in the range of 0.5 to 30 g/10 min;

a12) 20 to 40 wt. %, preferably 29 to 39 wt. %, more preferably 30 to 34 wt. %, based on the overall weight of polymer composition (p2) of a propylene based plastomer with a density determined according to ISO 1183-1 in the range of 0.850 to 0.910 g/cm³ and a MFR₂ (230° C., 2.16 kg) determined according to ISO 1133 in the range of 0.01 to 30 g/10 min; and a13) 5 to 20 wt. %, preferably 9 to 16 wt. % and more preferably 10 to 14 wt. %, based on the overall weight of polymer composition (p2) of a flame retardant, preferably an ammonium polyphosphate;

wherein components a11) to a13) add up to 100 wt. %;

B1) 65 to 95 wt. % of a virgin polyolefin composition (p3) comprising the following components:

b11) 40 to 65 wt. %, preferably 45 to 62 wt. % and more preferably 52 to 60 wt. %, based on the overall weight of the composition (p3) of an ethylene based plastomer with a density determined according to ISO 1183-1 in the range of 0.860 to 0.915 g/cm³ and a MFR₂ (190° C., 2.16 kg) determined according to ISO 1133 in the range of 0.5 to 30 g/10 min;

b12) 20 to 40 wt. %, preferably 29 to 39 wt. %, more preferably 30 to 34 wt. %, based on the overall weight of composition (p3) of a propylene based plastomer with a density determined according to ISO 1183-1 in the range of 0.850 to 0.910 g/cm³ and a MFR₂ (230° C., 2.16 kg) determined according to ISO 1133 in the range of 0.01 to 30 g/10 min; and b13) 5 to 20 wt. %, preferably 9 to 16 wt. % and more preferably 10 to 14 wt. %, based on the overall weight of composition (p3) of a flame retardant, preferably an ammonium polyphosphate;

with the proviso that the amounts of the flame retardant (FR) and components A1) and B1) add up to 100 wt. %.

The flame retardants (FR), a13) and b13) may be the same or different.

Another preferred polyolefin composition (X) for use according to the present invention comprises the following components:
- a flame retardant (FR);
- A1) 9 to 31 wt. %, preferably 10 to 20 wt. %, of a recycled polyolefin fabric substrate; wherein said fabric substrate is coated with a polyolefin composition (p2) comprising the following components:
  - a11) 40 to 65 wt. %, preferably 45 to 62 wt. % and more preferably 52 to 60 wt. % based on the overall weight of polyolefin composition (p2) of an ethylene based plastomer with a density determined according to ISO 1183-1 in the range of 0.865 to 0.905 g/cm$^3$ and a $MFR_2$ (190° C., 2.16 kg) determined according to ISO 1133 in the range of 2.5 to 12 g/10 min;
  - a12) 20 to 40 wt. %, preferably 29 to 39 wt. %, more preferably 30 to 34 wt. % based on the overall weight of polyolefin composition (p2) of a propylene based plastomer with a density determined according to ISO 1183-1 in the range of 0.855 to 0.900 g/cm$^3$ and a $MFR_2$ (230° C., 2.16 kg) determined according to ISO 1133 in the range of 3 to 22 g/10 min; and
  - a13) 5 to 20 wt. %, preferably 9 to 16 wt. % and more preferably 10 to 14 wt. % based on the overall weight of polyolefin composition (p2) of a flame retardant, preferably an ammonium polyphosphate;
  wherein components a11) to a13) add up to 100 wt. %;
- B1) 69 to 91 wt. %, preferably 80 to 90 wt. %, of a virgin polyolefin composition (p3) comprising the following components:
  - b11) 40 to 65 wt. %, preferably 45 to 62 wt. % and more preferably 52 to 60 wt. %, based on the overall weight of composition (p3) of an ethylene based plastomer with a density determined according to ISO 1183-1 in the range of 0.865 to 0.905 g/cm$^3$ and a $MFR_2$ (190° C., 2.16 kg) determined according to ISO 1133 in the range of 2.5 to 12 g/10 min;
  - b12) 20 to 40 wt. %, preferably 29 to 39 wt. %, more preferably 30 to 34 wt. %, based on the overall weight of composition (p3) of a propylene based plastomer with a density determined according to ISO 1183-1 in the range of 0.855 to 0.900 g/cm$^3$ and a $MFR_2$ (230° C., 2.16 kg) determined according to ISO 1133 in the range of 3 to 22 g/10 min; and
  - b13) 5 to 20 wt. %, preferably 9 to 16 wt. % and more preferably 10 to 14 wt. %, based on the overall weight of composition (p3) of a flame retardant, preferably an ammonium polyphosphate;

with the proviso that the amounts of the flame retardant (FR), and components A1) and B1) add up to 100 wt. %.

The flame retardants (FR), a13) and b13) may be the same or different.

Substrate

The substrate in the flame retardant materials of the present invention may be natural or synthetic, or may comprise both natural and synthetic components. Substrates can include fabrics, paper, aluminium foil and polymeric foil (e.g. biaxially oriented polypropylene (BOPP) or polyethylene terephthalate (PET)). Typically, the substrate is a fabric substrate. Synthetic materials include, for example, various synthetics based on polyolefins (e.g., polyethylene, polypropylene, etc.), nylon, jersey, polyester, polyurethane (e.g., a spandex material), and blends or combinations thereof. Natural materials include, for example, cotton, flax, hemp, silk, leather, or blends thereof.

In one embodiment, the fabric substrate may be a non-woven material. A "non-woven" fabric is a fabric or like material that is made from fibres bonded together by chemical, mechanical, heat or solvent treatment. The term is used to denote fabrics, like felt, which are neither woven nor knitted.

In an alternative embodiment, the fabric substrate layer is a woven material. Woven fabrics include knitted fabrics, in particular polypropylene knitted fabrics.

Preferably, the fabric substrate comprises a material of a weight of from 100 to 500, more typically of from 150 to 400 and even more typically of from 200 to 350, grams per square meter (g/m$^2$).

The fabric substrate is preferably prepared from polyester, polyethylene or polypropylene. The polyester, polyethylene or polypropylene may be virgin or recycled, or a mixture of virgin and recycled. More preferably the fabric substrate comprises polypropylene and most preferably the substrate consists of polypropylene. A particularly preferred substrate is a polypropylene knitted fabric.

It is within the ambit of the invention for the substrate, such as the fabric substrates as defined above, to itself comprise a flame retardant. Such flame retardants may be any as hereinbefore defined and may be the same or different to the flame retardant(s) present in the flame retardant polyolefin composition (X).

The polyolefin composition (X) may be applied to the substrate in any suitable way known in the art, for example by extrusion; calendaring using, for example, a roller system; lamination and knife coating (after dissolution of the composition in water with additives).

One exemplary coating method employs the calendaring coating equipment as shown in FIG. 1, consisting of two heated rollers, onto which the raw material or compounded polymer is placed, in the form of pellets. The rollers mix the polymer until a homogeneous blend is achieved, then the front roller transfers the melted coating onto the backer fabric at a set thickness (total thickness of the backer and coating together), and a surface texture is applied with a water-cooled embossing roller before the fabric is re-wound onto a roll.

Alternatively, where dry blends (the separate components—not compounded) are employed, these do not mix sufficiently to make a homogeneous coating and so these blends may be first compounded using a twin-screw extruder and, where possible, drawn through a water bath to a pelletiser to make compound pellets. These pellets can then be applied to the heated rollers for coating. More flexible blends may be too soft to cut into pellets. For these coatings, the compound can be extruded straight onto a metal spatula and then transferred to the rollers.

Figure 2:
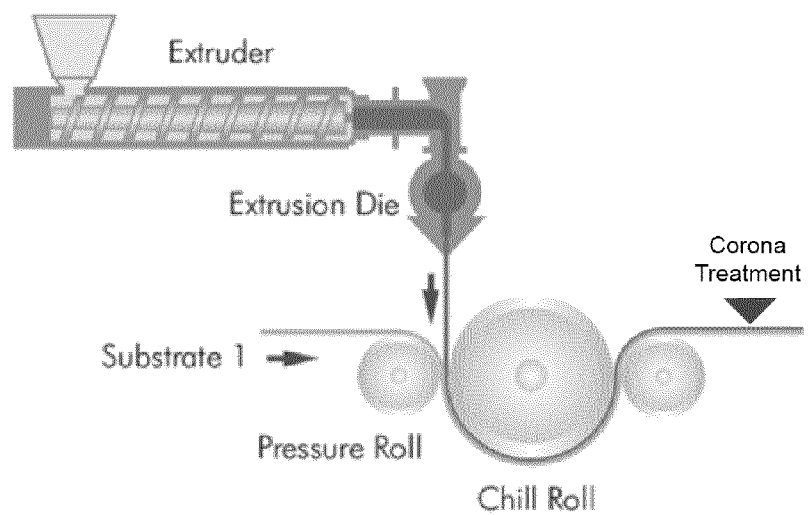
FIG. 2: Extrusion coating equipment

Another exemplary coating method employs the extrusion coating equipment shown in FIG. 2 in which the polyolefin coating is applied to the substrate by extrusion. Following cooling on a chill roll, an in-line corona treatment may be applied to the coated substrate.

The coating layer may be applied in an amount of 100 to 500 g/m$^2$, preferably 200 to 400 g/m$^{2'}$ more preferably 300 to 350 g/m$^2$. The coating may be between 0.05 and 0.5 mm, for example 0.09 to 0.4 mm. For coated fabrics, the thickness of the substrate plus coating is typically 0.5-1.5 mm, for example 0.7-1.0 mm, preferably 0.8-0.9 mm.

Corona Treatment

After application of the coating comprising the polyolefin flame retardant composition (X) to the substrate, the coated substrate may optionally be subjected to an embossing step and/or a corona treatment. Preferably, the coated substrate is corona-treated, and more preferably is both corona-treated and embossed. Corona treatment is a known technique which increases the surface energy of a polymer coating or film. Changing the surface energy can improve the adhesion between the coated substrate and the subsequent primer layer, thus improving the durability of the resulting flame retardant material.

For the corona treatment, the coated substrate may be passed between two conductor elements serving as electrodes, with such a high voltage, usually an alternating voltage (around 5 to 20 kV and 5 to 30 kHz), being applied between the electrodes that spray or corona discharges can occur. Due to the spray or corona discharge, the air above the coated surface is ionized and reacts with the molecules of the coating composition, causing formation of polar inclusions in the essentially non-polar polymer matrix. The treatment intensities may be in the usual range, preferably from 38 to 46 dynes/cm after production.

The corona treatment may be carried out immediately after the coating step, preferably using an inline corona treatment apparatus. Alternatively, it may be carried out at a later stage on a previously coated substrate. The treatment may use any suitable system or apparatus. Such systems include a power source and treatment station. The power source generally transforms 50/60 Hz plant power into much higher frequency power in a range of 10 to 30 kHz. This higher frequency energy is supplied to the treatment station and is applied to the coating surface by means of two electrodes, one with high potential and the other with low potential, through an air gap that typically ranges from 1.3 to 2.5 cm. The surface tension on the film surface is increased when the high potential difference that is generated ionizes the air.

One suitable system is a Vetaphone ET5 corona treater with an output power of 12 kW, a frequency of 18 to 35 kHz and an HF-amplifier with output voltage of 15 to 25 kV and multi-profile aluminium electrode. Another suitable system is a Corona Generator G20S supplied by AFS, with an energy loading was 800 W and a frequency in the range of 26 kHz to 28 kHz.

Primer Layer

Use of a primer improves the adhesion of the lacquer topcoat to the polyolefin coating, and hence improves the durability of the final material.

Suitable primers are known in the art and include primers available from Tramaco under the trade names TRAPYLEN and TRAPUR. Suitable primers include acrylic-modified polyethylene. One particularly suitable primer is a water-based dispersion of acrylic-modified polyethylene, such as that available under the name TRAPYLEN 9703W.

Suitable application rates will depend on the nature of the coated substrate and its intended use, and on the nature of the lacquer topcoat, and are in the range of 0.5 to 5 $g/m^2$, for example 0.5 to 4 $g/m^2$, more preferably 1.0 to 1.8 $g/m^2$, for example 1.0 to 1.5 $g/m^2$ calculated on a solids (i.e. dry) basis.

Application may be via any suitable method including spraying, knife-over-air coating, dipcoating or printing, for example tampo printing, pad printing or Rotogravue printing, of a solution or dispersion of the primer in water or an organic solvent, followed by evaporation of the water or solvent. A preferred application method is gravure printing. Typical solid loadings in the solution or dispersion are in the range of 5-25 wt %, preferably 10-20 wt %, more preferably about 13 wt %.

Prior to drying, the primer layer may have a thickness in the range of 5-30 microns, for example 10-15 microns, such as about 12 microns.

Evaporation can be carried out at a suitable temperature, depending on the primer used. For example, temperatures of about 80° C. and times of about 30 seconds may be suitable for solvent based systems, whilst temperatures of about 80 to 100° C. and times of about 60 seconds may be required for aqueous systems. The drying temperature should be selected so as to avoid any heat damage to the substrate or the polyolefin coating.

The use of aqueous primer systems is preferred for environmental reasons.

Lacquer Topcoat

The lacquer topcoat serves to increase scratch or abrasion resistance and may also reduce transfer of the polyolefin coatings to clothing, for example.

Suitable lacquer systems are known in the art and include acrylic lacquers, polyurethane lacquers and fluoropolymer lacquers. Preferred lacquers for use in the invention are polyurethane or fluoropolymer lacquers, more preferably polyurethanes. Preferably the lacquer is crosslinkable and crosslinkers may be added to improve formation of the topcoat. Suitable crosslinkers include polyfunctional carbodiimides.

Suitable lacquers and crosslinkers are available commercially from ROWA Lack GmbH, Germany, and include the ROWAFLON, ROWAKRYL, ROWATHAN and ROWATHAL lacquers and the crosslinkers ROWASET RS 64489 and 64092

The lacquer may be applied in the form of a solution or dispersion of the primer in water or an organic solvent, followed by evaporation of the water or solvent. Typical solid loadings in the solution or dispersion are in the range of 5-30 wt %, preferably 10-25 wt %, more preferably about 21-22 wt %.

Lacquers which are available as an aqueous dispersion or solution, rather than as a solution or dispersion in an organic solvent, are preferred for environmental reasons.

After application of the lacquer system, the lacquered material may be passed through a heater or oven to evaporate any solvent and dry the lacquer. Drying can include crosslinking of the lacquer. For example, an infrared radiator field can be used to heat the material to a temperature of approximately 80 to 100° C. A material passing through a 1 m long field at a speed of approximately 12 m/min will result in a drying time of about 5 seconds. The drying temperature should be selected to avoid any heat damage to the substrate or the polyolefin coating.

Both the primer layer and the topcoat may include pigments.

The lacquer topcoat is applied immediately following application of the primer layer. It may be applied by any suitable method, including for example by spraying, knife-over-air coating, dip coating or printing, for example tampo printing, pad printing or Rotogravue printing. A preferred application method is gravure printing. Preferably, it is applied in-line immediately following application of the primer.

Suitable application rates will depend on the nature of the coated substrate and its intended use and are in the range of 0.5 to 10 $g/m^2$, preferably 2 to 6 $g/m^2$, more preferably 2.5 to 5 $g/m^2$, for example about 3 $g/m^2$, calculated on a solids basis.

Typically, the lacquer topcoat will form about 1-10 wt % of the flame retardant material, preferably 3-7 wt %, for example about 5 wt %, based on the total weight of the flame retardant material.

Prior to drying, the lacquer layer may have a thickness in the range of 10-40 microns, for example 20-30 microns, such as about 24 or 25 microns.

Following application of the lacquer topcoat, the resulting material may be subjected at an optional embossing step. This embossing step may be in addition to, or instead of, any embossing step carried out prior to the primer application.

Figure 3:
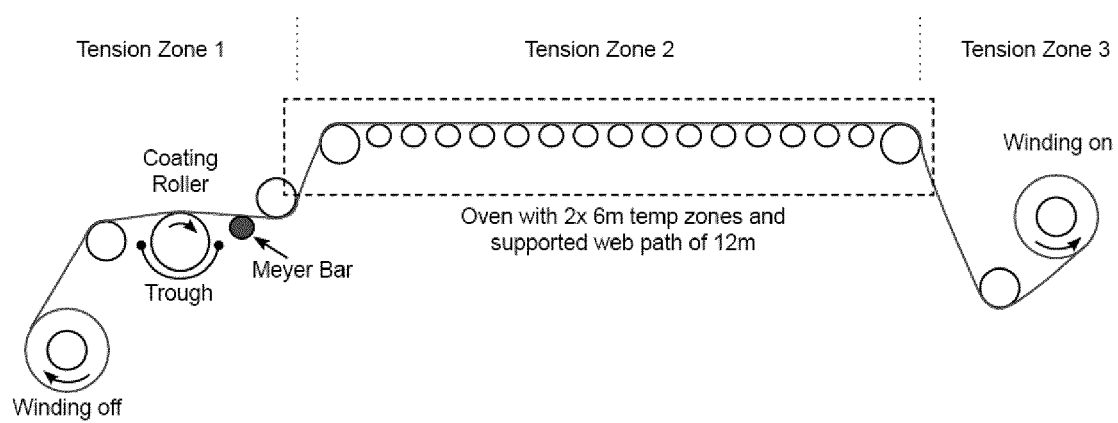
FIG. 3: System for applying primer or lacquer to a coated substrate

One exemplary application method for the primer or lacquer employs the coating equipment as shown in FIG. 3, comprising a coating roller which transfers the primer or lacquer solution or dispersion from a trough to the coated substrate. The treated substrate is then passed through an oven to dry the primer or lacquer coating, before being wound onto a roll. A Meyer bar provides means to control the add-on weight by removing excess solution or dispersion prior to drying. During drying, the treated substrate is preferably supported on rollers to prevent stretching.

A typical flame retardant fabric will have a thickness in the range of 0.5-1.5 mm, for example 0.8-1.1 or 0.7-1.0 mm, preferably 0.8-0.9 mm, following the primer and lacquer coating.

Durability of the materials of the invention may be assessed using standard tests for measuring abrasion resistance and/or flex resistance. Tests for abrasion resistance include ASTM D4157-13, ISO12947.4-1998, ISO 5470-1:2016 and ISO 5470-2:2003. A preferred abrasion test is the Martindale test (ISO12947.4-1998: The abrasion and pilling resistance testing of fabrics by the Martindale method-part 4: measurement of appearance change). Tests for flex resistance include ISO17674:2016 and ISO 7854:1995. Preferably, materials do not show significant cracking or delamination after at least 5,000 cycles, preferably at least 10,000 cycles, more preferably at least 15,000 cycles, even more preferably at least 20,000 cycles and most preferably at least 25,000 cycles, for example 25,000 to 30,000 cycles, in a flex test. Preferably, materials do not show significant abrasion damage after at least 5,000 cycles, preferably at least 10,000 cycles, more preferably at least 15,000 cycles, even more preferably at least 20,000 cycles and most preferably at least 25,000 cycles, for example 25,000-30,000 cycles, in an abrasion test.

Significant damage is defined herein as visible cracking or delamination.

When testing polypropylene-based substrates, care should be taken to avoid a build up of heat generated by friction, as this can cause weak spots to develop in the coating layer. If necessary, the frequency of the cycles can be reduced to minimise the risk of this friction/heat phenomenon influencing the test results.

Applications

The materials of the invention have flame retardant properties and may thus be employed in a range of applications where flame retardancy is desired.

For example, the materials may be used as a component of articles including furniture (including office and other non-domestic furniture), vehicle interiors, seat cushions, back rest cushions, pillows, upholstered furniture, bed mattresses, wall coverings, shoes (tongue, vamp, heel counter, quarter), sports bags, inlay of ski boots, sports equipment (e.g. boxing gloves, boxing balls), carpets, rubber boats, swimming pools, life vests, handbags, purses, table coverings, table mats, stationary (e.g. books and wood inlay), saddlebags, and tool bags. Preferred uses include furniture and vehicle interiors.

Preferred articles including the flame retardant polyolefin composition comprising components A) and B) as defined above include consumer goods or houseware, preferably caps, closures and packaging containers, boxes, cutlery trays, and garbage bins.

The invention will now be described with reference to the following non limiting figures and examples.

FIG. 1: Calendaring coating roller equipment
FIG. 2: Extrusion coating equipment
FIG. 3: System for applying primer or lacquer to a coated substrate Test Methods:

The following definitions of terms and determination methods apply for the above general description of the invention as well as to the below examples unless otherwise defined.

Density

Density of the materials is measured according to ISO 1183-1:2012, with isopropanol-water as gradient liquid. Sample preparation is done by compression molding in accordance with ISO 1872-2. The cooling rate of the plaques when crystallising the samples was 15° C./min. Conditioning time was 16 hours.

Melt Flow Rate (MFR) or Melt Index (MI)

The melt flow rate (MFR) is determined according to ISO 1133 and is indicated in g/10 min. The MFR is an indication of the melt viscosity and flowability, and hence the processability, of the polymer. The higher the melt flow rate, the lower the viscosity of the polymer. The MFR is determined at 190° C. for ethylene-based plastomers and at 230° C. for propylene based plastomers. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Molecular Weights, Molecular Weight Distribution, Mn, Mw, MWD

The weight average molecular weight Mw and the molecular weight distribution (MWD=Mw/Mn wherein Mn is the number average molecular weight and Mw is the weight average molecular weight) is measured by a method based on ISO 16014-4:2003.

Comonomer Content

Comonomer Content (% wt and % mol) was determined by using $^{13}$C-NMR. The $^{13}$C-NMR spectra were recorded on Bruker 400 MHz spectrometer at 130° C. from samples dissolved in 1,2,4-trichlorobenzene/benzene-$d_6$ (90/10 w/w). Conversion between % wt and % mol can be carried out by calculation.

Cigarette Test

An assessment of ignitability was carried out in accordance with the BS EN 1021-1:2006 smouldering cigarette test Flame Retardancy Flame retardant behaviour was assessed using an FTT Dual Cone Calorimeter R1771 according to ISO 5660:2015.

Tensile Strength

Tensile strength was measured according to BS EN ISO 1421:2016

UV Measurements

Colourfastness to UV was tested according to ASTM G155-05a. The test was carried out for 200 hours using a Xenon Arc Lamp-Pass if no appreciable colour change.

Abrasion

Abrasion resistance is measured according to ISO12947.4-1998: The abrasion and pilling resistance testing of fabrics by the Martindale method-part 4: measurement of appearance change.

Bally Flexometer Test

Flexometer testing was carried out according to ISO 5402-1.

EXPERIMENTAL

Materials

Propylene based plastomer (PP plast): a random propylene ethylene metallocene plastomer, density=0.862 g/cm$^3$, MFR$_2$ (230° C., 2.16 kg)=20 g/10 min, Flexural modulus=11 MPa Ethylene based plastomer (1) (PE plast 1): an ethylene octene metallocene plastomer, density=0.870 g/cm$^3$, MFR$_2$ (190° C./2.16 kg)=6.6 g/10 min Ethylene based plastomer (2) (PE plast 2): an ethylene octene metallocene plastomer, density=0.902 g/cm$^3$, MFR$_2$ (190° C./2.16 kg)=10 g/10 min Ethylene based plastomer (3) (PE plast 3): an ethylene octene metallocene plastomer, density=0.902 g/cm$^3$, MFR$_2$ (190° C./2.16 kg)=3 g/10 min High MFR PP plastomer (1): a random propylene ethylene metallocene plastomer, density=0.879 g/cm$^3$, MFR$_2$ (230° C., 2.16 kg)=7715 g/10 min Polypropylene copolymer (PP copo): a propylene ethylene random heterophasic copolymer, density=890 g/cm$^3$, MFR$_2$ (230° C., 2.16 kg)=3.8 g/10 min Flame retardant 1 (FR1): ammonium polyphosphate (commercially available ADKSTAB FP2500S)

Flame retardant 2 (FR2): copolymer of ethylene, methyl acrylate and vinyl trimethoxy silane (VTMS), density=0.946 g/cm$^3$, MFR$_2$ (190° C./2.16 kg)=3 g/10 min Flame retardant 3 (FR3): ammonium polyphosphate (commercially available IC FR5110)

Reference Examples 1 to 22: Preparation of Compositions

Twenty-two flame retardant polyolefin compositions as shown in Table 1 were prepared by gravimetric feeding of various components to a twin screw extruder.

TABLE 1

| | PP Plast | PE Plast 1 | PE Plast 2 | PE Plast 3 | High MFR PP plast | PP copo | FR1 | FR2 | FR3 | Proc. Additive | Emulsifier (GMS) | UV additive | Anti-static additive | Pigment |
|---|---|---|---|---|---|---|---|---|---|---|---|---|---|---|
| RE1  | 10   | 40   | —  | — | —   | 10   | —  | —   | 16   | —  | —  | —   | —  | —   |
| RE2  | 10   | 40   | —  | — | —   | 10   | —  | —   | 16   | 2.5 | —  | —   | —  | —   |
| RE3  | 10   | 40   | —  | — | —   | 10   | —  | —   | 22   | 5   | —  | —   | —  | —   |
| RE4  | 10   | 40   | —  | — | —   | 10   | —  | —   | 22   | 2.5 | —  | —   | —  | —   |
| RE5  | 10   | 40   | 30 | — | —   | 10   | —  | —   | 4    | —  | —  | —   | —  | —   |
| RE6  | 9    | 36   | 36 | — | —   | 9    | —  | —   | 3.6  | 2.5 | —  | —   | —  | —   |
| RE7  | 30   | 43   | —  | — | 3   | —    | —  | 10  | 12   | 8   | 3  | 2   | —  | 3   |
| RE8  | 30   | 43   | —  | — | 3   | —    | —  | 10  | 12   | 6   | 3  | 2   | 3  | 3   |
| RE9  | 30   | 43   | —  | — | 3   | —    | —  | 10  | 12   | 6   | 3  | 2   | 4  | 3   |
| RE10 | 30   | 43   | —  | — | 3   | —    | —  | 10  | 12   | 6   | 3  | 2   | 6  | 3   |
| RE11 | 30   | 43   | —  | — | 3   | —    | —  | 10  | 12   | 6   | 3  | 2   | 10 | 3   |
| RE12 | 30   | 43   | —  | 6 | 1   | —    | —  | 10  | 12   | 8   | 3  | 2   | —  | 3   |
| RE13 | 30   | 43   | —  | — | 1   | —    | —  | 10  | 6    | 8   | 3  | 2   | 3  | 3   |
| RE14 | 30   | 43   | —  | — | 1   | —    | —  | 10  | —    | 8   | 3  | 2   | 3  | 3   |
| RE15 | 30   | 43   | —  | — | 1   | —    | —  | 10  | 12   | 8   | 3  | 2   | 3  | 3   |
| RE16 | 30   | 43   | —  | — | 1   | —    | —  | 10  | 18   | 8   | 3  | 2   | 3  | 3   |
| RE17 | 30   | 43   | —  | — | 1   | —    | —  | 15  | 24   | 8   | 3  | 2   | 3  | 3   |
| RE18 | 30   | 43   | —  | — | 1   | —    | —  | 10  | 12   | 8   | 3  | 2   | 3  | 3   |
| RE19 | 30   | 43   | —  | — | 1   | —    | —  | 10  | 12   | —  | 3  | 2   | —  | 3   |
| RE20 | 31   | 41   | —  | — | 1   | 10.3 | —  | 5.2 | 6.2  | —  | —  | 2.1 | —  | 3.1 |
| RE21 | 28.9 | 38.9 | —  | — | 1   | 9.7  | —  | 4.9 | 11.7 | —  | —  | 2   | —  | 2.9 |
| RE22 | 26.9 | 35.9 | —  | — | 0.9 | 9    | —  | 6.7 | 16.1 | —  | —  | 1.8 | —  | 2.7 |

Reference Examples 22 to 27: Production of Coated Substrates & Cigarette Test Results Five additional compositions (RE23 to RE27) were prepared in the same manner as for RE1 to RE22 and were coated onto fabric substrates using the following methods. Lab-scale calendaring coating equipment (FIG. 1) was employed, consisting of two heated rollers, onto which the raw material or compounded polymer was placed, in the form of pellets. The rollers mixed the polymer until a homogeneous blend was achieved, then the front roller transfered the melted coating onto the backer fabric at a set thickness (total thickness of the backer and coating together), and a surface texture was applied with a water-cooled embossing roller before the fabric was re-wound onto a roll. Dry blends (the separate components—not compounded) do not mix sufficiently to make a homogeneous coating. Therefore, these blends were first compounded using a twin-screw extruder and, where possible, drawn through a water bath to a pelletizer to make compound pellets. These pellets were then applied to the heated rollers for coating. The more flexible blends were too soft to cut into pellets. For these coatings, the compound was extruded straight onto a metal spatula and then transferred to the rollers A polyurethane lacquer was further added and the materials subjected to the Cigarette test. The formulations used and the results of the tests are shown in Table 2. Tables 3 to 7 show flame retardancy, flex, tensile strength and UV data for selected compositions.

TABLE 2

Coated substrate formulations & Cigarette test results (figures represent parts by weight)

| | Substrate | PE Plastomer 1 | Pigment | PP Plastomer | High MFR PP plastomer | Flame retardant 1 | Flame retardant 2 | UV additive | Lacquer | Cig. test |
|---|---|---|---|---|---|---|---|---|---|---|
| RE23 | PP jersey | 43 | 3 White | 30 | 3 | 12 | 10 | 2 | PU | Pass |
| RE24 | PP jersey | 43 | 3 Orange | 30 | 3 | 12 | 10 | 2 | PU | Pass |
| RE25 | PP-FR* | 43 | 3 Blue | 30 | 3 | 2 | 10 | 2 | PU | Pass |
| RE26 | PP jersey | 43 | 3 Blue | 30 | 3 | 18 | 10 | 2 | PU | Pass |
| RE27 | PP-FR* | 43 | 3 Blue | 30 | 3 | 18 | 10 | 2 | PU | Pass |

*Polypropylene substrate comprising flame retardant

TABLE 3

Flame Retardancy results

| | Observations | | | |
|---|---|---|---|---|
| Characteristic | RE2 | RE4 | RE6 | Comments |
| Initial inflammation | Surface began to degrade after 5 seconds | Surface began to degrade after 4 seconds | Surface began to degrade after 4 seconds | No concern |
| Scorch length | Sample completely burnt in 180 seconds | 27 cm | 19 cm | EU Guidance - max 25 cm |
| Burn rate after 3 min | 60 mm/s | >120 mm/s | 15 mm/s | |

TABLE 4

Flame Retardancy results (test carried out on composition only, no fabric)

| | | RE24 | RE26 |
|---|---|---|---|
| burning time | s | 138 | 177.5 |
| burning time #1 | s | 230 | 305 |
| burning time SD | s | 130.1 | 180.3 |
| comment | | | Char formation |
| heat release rate | kW/m2 | 97.56 | 92.6 |
| heat release rate #1 | kW/m2 | 97.56 | 92.6 |
| heat release rate SD | kW/m2 | 0 | 0 |
| ignition time | s | 138 | 177.5 |
| Ignition time #1 | s | 46 | 50 |
| Ignition time #2 | s | | |
| ignition time SD | s | 130.1 | 180.3 |
| Oxygen content | % | 19 | 21 |

TABLE 5

Tensile Strength data

| | Force at break (N) | Force at 45% elongation (N) | Force at 100% elongation (N) | Force at 150% elongation (N) | Elongation at break (%) |
|---|---|---|---|---|---|
| RE8 (open eye backer) | | | | | |
| Warp (MD) 1 | 915.3 | 540.5 | — | — | 89.3 |
| Warp (MD) 2 | 915.3 | 549.4 | — | — | 88.9 |
| Warp (MD) 3 | 925.1 | 553.4 | — | — | 90.8 |
| Warp (MD) Mean | 920.2 | 546.4 | N/A | N/A | 89.7 |
| Weft (CD) 1 | 321.8 | 111.8 | 158 | 191.7 | 131.6 |
| Weft (CD) 2 | 336.5 | 107.2 | 152.1 | 186.1 | 141.6 |
| Weft (CD) 3 | 351.2 | 109.9 | 156 | 192.1 | 144.4 |
| Weft (CD) Mean | 336.4 | 109.7 | 156 | 189.9 | 139.2 |
| RE15 (Jersey knit backer) | | | | | |
| Warp (MD) 1 | 937.8 | 555.2 | — | — | 86.4 |
| Warp (MD) 2 | 894.7 | 558.2 | — | — | 841 |
| Warp (MD) 3 | 922.1 | 571.9 | — | — | 85 |
| Warp (MD) Mean | 918.2 | 561.8 | N/A | N/A | 84.1 |
| Weft (CD) 1 | 345.3 | 138 | 142.8 | 165.3 | 167 |
| Weft (CD) 2 | 322.7 | 102.8 | 136.8 | 159.2 | 161.6 |
| Weft (CD) 3 | 310 | 105 | 139.7 | 162.1 | 156.4 |
| Weft (CD) Mean | 326.1 | 114.8 | 139.8 | 162.2 | 161.7 |

TABLE 6

UV data

| | RE20 | RE21 | RE22 |
|---|---|---|---|
| UV test result | Pass | Pass | Pass |

Reference Examples 28 to 33

Measurement Methods
Tensile Modulus, Tensile Strength, Tensile Strain at Break, Tensile Strain at Tensile Strength, Tensile Stress at Break The measurements were conducted after 96 h conditioning time (at 23° C. at 50% relative humidity) of the test specimen. The test specimens were prepared according to ISO 294-1.

Tensile Modulus was measured according to ISO 527-2 (cross head speed=1 mm/min; 23° C.).

Tensile Strength was measured according to ISO 527-2 (cross head speed=50 mm/min; 23° C.).

Tensile Strain at Break was measured according to ISO 527-2 (cross head speed=50 mm/min; 23° C.).

Tensile Strain at Tensile Strength was determined according to ISO 527-2 with an elongation rate of 50 mm/min until the specimen broke.

Tensile Stress at Break was determined according to ISO 527-2 (cross head speed=50 mm/min).

Tensile Stress at Yield was determined according to ISO 527-2 (cross head speed=50 mm/min).

Charpy Notched Impact Strength

Charpy Notched impact strength was determined (after 96 hours of conditioning at 23° C. and 50% relative humidity) according to ISO 179 1eA at 23° C. and −20° C. using 80×10×4 mm$^3$ test bars injection moulded in line with EN ISO 1873-2.

Determination of the Content of Isotactic Polypropylene (iPP), Polystyrene (PS), Ethylene and Polyamide-6 in Purpolen Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50-100 μm thickness prepared by compression molding at 190° C. and 4 to 6 mPa. Standard transmission FTIR spectroscopy was employed using a spectral range of 4000 to 400 cm$^{-1}$ an aperture of 6 mm, a spectral resolution of 2 cm$^{-1}$, 16 background scans, 16 spectrum scans, an interferogram zero filling factor of 32 and Norton Beer strong apodisation.

The absorption of the band at 1167 cm$^{-1}$ in iPP was measured and the iPP content was quantified according to a calibration curve (absorption/thickness in cm versus iPP content in wt. %).

The absorption of the band at 1601 cm$^{-1}$ (PS) and 3300 cm$^{-1}$ (PA6) were measured and the PS- and PA6 content quantified according to the calibration curve (absorption/thickness in cm versus PS and PA content in wt. %). The content of ethylene was obtained by subtracting the content of iPP, PS and PA6 from 100. The analysis was performed as double determination.

Materials Used

Component A): Recycled Polyolefin Fabric Substrate

Coated polyolefin fabric substrates in sheet form were shredded by using a Wittmann mill at ambient temperature into small pieces which are about the same size of a standard polymer pellet. The polyolefin fabric substrate used was a PP-based knitted fabric having on top 2 thin layers (thickness approx. 0.09 mm and 0.4 mm), each comprising the coating composition as defined in Table 7, as well as lacquers in the amounts as specified below. The lacquers consist of other non-polyolefin based resins, mainly polyurethane and polyacrylate.

Lacquer: 5.0 wt. % based on the total weight of the coated polyolefin fabric substrate Coating composition: 65 wt. % based on the total weight of the coated polyolefin fabric substrate Polypropylene fabric: 30 wt. % based on the total weight of the coated polyolefin fabric substrate (thickness: 0.5 mm)

TABLE 7

Composition of the coating of the recycled polyolefin fabric substrate.

| Content [wt. %] | Description | Tradename/Supplier |
| --- | --- | --- |
| 45.8 | Ethylene based plastomer: an ethylene octene metallocene plastomer, density = 0.870 g/cm$^3$, MFR$_2$ (190° C./2.16 kg) = 6.6 g/10 min (=component a1) | QUEO 7007LA/ Borealis AG |
| 11.0 | Ethylene based plastomer: an ethylene octene metallocene plastomer, density = 0.902 g/cm$^3$, MFR$_2$ (190° C./2.16 kg) = 3 g/10 min (=component a1) | QUEO 0203/ Borealis AG |
| 31.45 | Random propylene ethylene metallocene plastomer, density = 0.862 g/cm$^3$, MFR$_2$ (230° C., 2.16 kg) = 20 g/10 min (=component a2), Flexural modulus = 11 MPa | Vistamaxx 6202/ Exxon Mobile |
| 11.0 | Ammonium polyphosphate (flame retardant = component a3) | ADKSTAB FP2500S/ ADEKA Polymer Additives Europe |
| 0.75 | Stabilizer mixture comprising UV-stabilizers and antioxidants | — |

Component B)

Recycled Polymer Blend (Purpolen PP)

Purpolen PP is a recycled polymer mixture comprising as main components polyethylene and polypropylene obtained from mtm plastics GmbH, Niedergebra (Germany).

TABLE 8

Composition of the recycled polymer blend.

| | content of component b1) determined by FTIR (PP) | content of component b2) determined by FTIR (PE) |
| --- | --- | --- |
| Purpolen | 87.4 wt. % | 10.5 wt. % |

Purpolen adds up with PS and PA 6 (content also determined by FTIR) to 100 wt. %.

Virgin Hompolypropylene (HF420FB)

HF420FB is a polypropylene homopolymer, commercially available from *Borealis* AG (Austria), Melt Flow Rate (230° C./2.16 kg, ISO 1133) of 19.0 g/10 min and melting temperature (determined by DSC according to ISO 11357/03) of 1161° C.

Manufacturing of the Polymer Composition

The polymer compositions according to the Reference Examples RE28 to RE33 were manufactured by feeding component A) into a co-rotating twin screw side feeder (extruder prism TSE 24MC) which allowed an accurate feeding and dosing of the material into the extruder. Component B) was fed in the form of granules into the same extruder via the main hopper. In the extruder components A)

and B) were melt blended (230° C., output rate 6 kg/hour) and subsequently pelletized by an underwater cooling system. The obtained pellets were collected, dried and tested. The materials according to CE1 and CE3 were not compounded. The amounts of the different components in the polymer compositions and the properties of the polymer compositions according to the inventive examples and the comparative examples can be gathered from below Tables 9 and 10.

TABLE 9

Composition and properties of the polymer compositions comprising a virgin homopolypropylene.

|  | Unit | RE28 | RE29 | RE30 | CE1 | CE2 |
|---|---|---|---|---|---|---|
| Component |  |  |  |  |  |  |
| Recycled polyolefin fabric substrate (A) | wt. % | 10 | 20 | 30 | — | 100- |
| HF420B (B) | wt. % | 90 | 80 | 70 | 100 | — |
| Properties |  |  |  |  |  |  |
| $MFR_2$ | g/10 min | 19.4 | 19.0 | 18.8 | 19.5 | n.d. |
| Tensile Modulus | MPa | 1170 | 1020 | 948 | 1270 | 266 |
| Tensile Stress at Yield | MPa | 29.3 | 25.6 | 23.8 | 31.6 | n.d. |
| Tensile Strength | MPa | 29.3 | 25.6 | 23.8 | 31.6 | 9.3 |
| Tensile Strain at Tensile Strength | % | 11.2 | 12.0 | 13.2 | 10.7 | 358 |
| Tensile Stress at Break | MPa | 13.4 | n.d. | n.d. | 17.4 | 9.1 |
| Tensile Strain at Break | % | 616 | n.d. | n.d. | 628 | 360 |
| Charpy Notched Impact Strength 23° C. | $KJ/m^2$ | 3.6 | 4.3 | 5.2 | 2.3 | n.d. | n.d. = not determined.

TABLE 10

Composition and properties of the polymer compositions comprising a recycled polymer blend.

|  | Unit | RE31 | RE32 | RE33 | CE3 |
|---|---|---|---|---|---|
| Component |  |  |  |  |  |
| Recycled polyolefin fabric substrate (A) | wt. % | 10 | 20 | 30 | 100 |
| Purpolen PP (B) | wt. % | 90 | 80 | 70 | — |
| Properties |  |  |  |  |  |
| $MFR_2$ | g/10 min | 22.6 | 22.2 | 21.3 | 24.0 |
| Tensile Modulus | MPa | 1094 | 962 | 834 | 1268 |
| Tensile Stress at Yield | MPa | 22.5 | 20.6 | 18.7 | 25.0 |
| Tensile Strength | MPa | 22.5 | 20.6 | 18.7 | 25.0 |
| Tensile Strain at Tensile Strength | % | 5.8 | 7.4 | 10.2 | 5.0 |
| Tensile Stress at Break | MPa | 17.1 | 12.7 | 12.3 | 20.3 |
| Tensile Strain at Break | % | 18.2 | 26.9 | 46.1 | 14.1 |
| Charpy Notched Impact Strength 23° C. | $kJ/m^2$ | 6.6 | 8.3 | 10.0 | 5.3 |

Discussion of the Results

As can be seen from Table 9, the addition of a recycled polyolefin fabric substrate to a virgin polypropylene significantly improves the toughness, expressed by the Charpy Notched Impact Strength at 23° C., of the polymer composition while the stiffness of the material is still at a good level. The experimental data in Table 10 confirm that said technical effect is also observed in recycled polymer blends. In addition, the presence of a recycled polyolefin fabric substrate in a recycled polymer blend also significantly improves the Tensile Strain at Break of the polymer composition.

Reference Examples 34 to 36

Measurement Methods

Glow wire and LOI measurements are based on specimens (plaques) prepared by compression-moulding according to ISO 29 (Collin R 1358, edition: 2/060510). The plaques have a surface area of 140×150 mm and a thickness of 1 mm and 3 mm.

Limited Oxygen Index (LOI)

LOI (Stanton Redcroft from Rheometric Scientific) was performed by following ASTM D2863-17a. The plaques prepared as described above were placed in a climate room with relative humidity 50±5% and temperature 23° C. for at least 24 hours prior to the test. Ten sample rods having length 135 mm, width 6.5 mm and thickness of 3 mm were punched from a plaque. A single sample rod was placed vertically in a glass chimney with a controlled atmosphere of oxygen and nitrogen that had been flowing through the chimney for at least 30 seconds and then ignited by an external flame on the top. If the sample had a flame present after three minutes or if the flame had burned down more than 50 mm, the test failed. Different oxygen concentrations were tested until a minimum oxygen level was reached where the sample passed the test and the flame was extinguished before three minutes or 50 mm.

Glow Wire Test

The glow wire test was conducted according to IEC60695-1-30:2008 IEC60695-2-10:2000 IEC60695-2-13 Part 2-13. The glow-wire test is a test procedure to simulate the effects of thermal stresses which may be produced by heat sources such as glowing elements or overloaded resistors in order to assess the fire hazards by simulation technique. The test procedure is a small-scale test in which an electrically heated wire is used as a source of ignition on a series of standard test specimens to determine the glow-wire flammability index, GWFI and the glow-wire ignitability index, GWIT. GWFI is the highest temperature at which the tested material:

a) does not ignite or, if it does, extinguishes within 30 seconds after removal of the glow wire and is not totally consumed, or b) molten drips, if they occur, do not ignite the wrapping tissue.

GWIT is the temperature which is 25° C. higher than the maximum test temperature at which the tested material:
a) does not ignite, or
b) if sustained and continuous flaming combustion does not occur for a time longer than 5 seconds for any single flame event and the specimen is not totally consumed.

Materials Used

Component A1): Recycled Polyolefin Fabric Substrate

Coated polyolefin fabric substrates in sheet form were shredded using a Wittmann mill at ambient temperature into small pieces which are about the size of a standard polymer pellet. The polyolefin fabric substrate used was a PP-based knitted fabric having on top 2 thin layers (thickness approx. 0.09 mm and 0.4 mm), each comprising the coating composition as defined in Table 11, as well as lacquers in the amounts as specified below. The lacquers consist of other non-polyolefin based resins, mainly polyurethane and polyacrylate.

Lacquer: 5.0 wt. % based on the total weight of the coated polyolefin fabric substrate Coating composition: 65 wt. % based on the total weight of the coated polyolefin fabric substrate Polypropylene fabric: 30 wt. % based on the total weight of the coated polyolefin fabric substrate (thickness: 0.5 mm)

TABLE 11

Composition of the coating of the recycled polyolefin fabric substrate.

| Content [wt. %] | Description | Tradename/Supplier |
|---|---|---|
| 45.8 | Ethylene based plastomer: an ethylene octene metallocene plastomer, density = 0.870 g/cm³, MFR$_2$ (190° C./2.16 kg) = 6.6 g/10 min (=component a11) | QUEO 7007LA/ Borealis AG |
| 11.0 | Ethylene based plastomer: an ethylene octene metallocene plastomer, density = 0.902 g/cm³, MFR$_2$ (190° C./2.16 kg) = 3 g/10 min (=component a11) | QUEO 0203/ Borealis AG |
| 31.45 | Random propylene ethylene metallocene plastomer, density = 0.862 g/cm³, MFR$_2$ (230° C., 2.16 kg) = 20 g/10 min (=component a12), Flexural modulus = 11 MPa | Vistamaxx 6202/ Exxon Mobile |
| 11.0 | Ammonium polyphosphate (flame retardant = component a13) | ADKSTAB FP2500S/ ADEKA Polymer Additives Europe |
| 0.75 | Stabilizer mixture comprising UV-stabilizers and antioxidants | — |

Component B1): Virgin Flame-Retardant Polyolefin Composition

The virgin flame-retardant polyolefin composition used in these Examples comprises the components summarized in below Table 12.

TABLE 12

Composition of the virgin flame-retardant polyolefin composition (B1).

| Content [wt. %] | Description | Tradename/Supplier |
|---|---|---|
| 45.8 | Ethylene based plastomer: an ethylene octene metallocene plastomer, density = 0.870 g/cm³, MFR$_2$ (190° C./2.16 kg) = 6.6 g/10 min (= component b11) | QUEO 7007LA/ Borealis AG |
| 11.0 | Ethylene based plastomer: an ethylene octene metallocene plastomer, density = 0.902 g/cm³, MFR$_2$ (190° C./2.16 kg) = 3 g/10 min (= component b11) | QUEO 0203/ Borealis AG |
| 31.45 | Random propylene ethylene metallocene plastomer, density = 0.862 g/cm³, MFR$_2$ (230° C., 2.16 kg) = 20 g/10 min (= component b12), Flexural modulus = 11 MPa | Vistamaxx 6202/ Exxon Mobile |
| 11.0 | Ammonium polyphosphate (flame retardant = component b13) | ADKSTAB FP2500S/ ADEKA Polymer Additives Europe |
| 0.75 | Stabilizer mixture comprising UV-stabilizers and antioxidants | — |

Manufacturing of the Polymer Composition

The polymer compositions according to the Reference Examples RE34 to RE36 were manufactured by feeding component A1) into a co-rotating twin screw side feeder (extruder prism TSE 24MC) which allowed an accurate feeding and dosing of the material into the extruder. Component B1) was fed in the form of granules into the same extruder via the main hopper. In the extruder components A1) and B1) were melt blended (230° C., output rate 6 kg/hour) and subsequently pelletized by an underwater cooling system. The obtained pellets were collected, dried and submitted tested. The materials according to CE4 and CE5 were not compounded. The amounts of the different components in the polymer compositions and the properties of the polymer compositions according to the inventive examples and the comparative examples can be gathered from below Table 13.

TABLE 13

Composition and properties of the polymer compositions.

|  | Unit | IE1 | IE2 | IE3 | CE4 | CE5 |
|---|---|---|---|---|---|---|
| Component |  |  |  |  |  |  |
| virgin PO composition (B) | wt. % | 90 | 80 | 70 | 100 | — |
| Recycled polyolefin fabric substrate (A) | wt. % | 10 | 20 | 30 | — | 100 |
| Properties |  |  |  |  |  |  |
| MFR$_2$ | g/10 min | 6.4 | 7.5 | 8.2 | 5.6 | n.d. |
| Tensile Modulus | MPa | 24.0 | 36.0 | 49.0 | 20.0 | 266 |
| Tensile Strength | MPa | 12.2 | 10.9 | 9.6 | 13.0 | 9.3 |
| Tensile Strain at Tensile Strength | % | 1158 | 978 | 801 | 1191 | 358 |
| Tensile Stress at Break | MPa | 12.0 | 10.8 | 9.4 | 12.9 | 9.1 |
| Tensile Strain at Break | % | 1158 | 978 | 801 | 1191 | 360 |
| LOI | % | 25.5 | 24.5 | 25.0 | 26.0 | 20.5 |
| Glow Wire test for specimens 60 × 60 × 3 mm |  |  |  |  |  |  |
| GWFI | ° C. | 825 | 825 | 850 | 850 | 825 |
| GWIT | ° C. | 850 | 850 | 875 | 875 | 850 |
| Glow Wire test for specimens 60 × 60 × 1 mm |  |  |  |  |  |  |
| GWFI | ° C. | 875 | 875 | 875 | 875 | 875 |
| GWIT | ° C. | 900 | 900 | 900 | 900 | 900 | n.d. = not determined.

Discussion of the Results

As can be gathered from Table 13, a polymer composition comprising 10 wt. % or 20 wt. % component (A1) (=recycled material) still shows very good tensile properties (see low values for examples RE34 and RE35). Even a polymer composition comprising 30 wt. % of component (A1) shows acceptable tensile properties. The polymer composition according to the reference examples and CE4 (virgin PO composition) are at the same LOI-level and clearly above that of the recycled polyolefin fabrics (CE5). The Glow Wire test shows comparable values between the polyolefin compositions according to the invention (RE34 to RE36) and the comparative examples (CE4 and CE5). Thus, the experimental trials show that the use of recycled materials does not cause a deterioration in the flame retardance behaviour.

Inventive Example 1

TABLE 15

| Coating composition | | |
|---|---|---|
| Component | Description | Wt. % |
| IRGAFOS 168 FF | Phosphite processing stabilizer | 0.08 |
| KINOX-34 | Antioxidant - processing aid | 0.08 |
| SABOSTAB UV 94 | UV stabiliser | 0.60 |
| ADK STAB FP-2500S | Flame retardant | 11.00 |
| QUEO 7007LA (Borealis AG) | Ethylene based plastomer: an ethylene octene metallocene plastomer, density = 0.870 g/cm$^3$, MFR$_2$ (190° C./2.16 kg) = 6.6 g/10 min | 45.80 |
| VISTAMAXX 6202 (Exxon Mobile) | Random propylene ethylene metallocene plastomer, density = 0.862 g/cm$^3$, MFR$_2$ (230° C., 2.16 kg) = 20 g/10 min, Flexural modulus = 11 MPa | 31.45 |
| QUEO 0203 (Borealis AG) | Ethylene based plastomer: an ethylene octene metallocene plastomer, density = 0.902 g/cm$^3$, MFR$_2$ (190° C./2.16 kg) = 3 g/10 min | 11.00 |

A knitted polypropylene substrate was coated with the polyolefin composition shown in Table 15. After corona-treatment, the following primer and lacquer were applied:

Lacquer Primer: Tramaco Trapylen 9703W

Water-based dispersion of acrylic-modified polyethylene

13% solid content 35 s flow time 9 pH

Target dry weight 3-4 gsm

Drying conditions 60 s at 80° C.

w

Lacquer Topcoat: ROWA Lack ROWAFLON M-74809W and ROWASET RS 64489 Crosslinker

Water-based dispersion of a fluoropolymer

Low viscosity 21.5% solid content 60 s flow time

Target dry weight 3-4 gsm

Drying conditions 30 s at 100° C.

Mixed with Crosslinker RS 64489 (Carbodiimide)

i. Mixing ratio: 100:3 ii. Pot life ~8 hours

A standard Martindale test (ISO12947.4-1998 The abrasion and pilling resistance testing of fabrics by the Martindale method-part 4: measurement of appearance change) was run on the resulting material. The results were indicative of good adhesion to the substrate and improved abrasion resistance versus unlacquered material.

Inventive Example 2

A polypropylene substrate coated with the composition of Table 15 was corona treated was then treated with a primer and lacquer combination as shown in Table 16. The treated substrate was compared to a coated substrate without the primer and lacquer treatment in a Bally Flex test.

TABLE 16

Tests results at room temperature, Bally flex test.

| Example | Primer system | Primer and Lacquer | Comment at 1,000 cycles - | Comment at 5,000 cycles | Comment at 10,000 cycles |
|---|---|---|---|---|---|
| CE1 | No primer or lacquer applied | None | Good condition | Slight cracking to coating compound | Slight cracking to coating compound |
| IE2 | Water based (2 layers) | Primer Trapylen 9703W and PU-topcoat LA 1620-1BH01 (crosslinked with ROWASET 64489) | Good condition indicating good initial adhesion of lacquer to substrate | Good condition indicating good adhesion of lacquer to substrate | Good condition indicating good adhesion of lacquer to substrate |

As can be seen from the Table, the substrate with both a primer layer and a lacquer topcoat showed improved abrasion resistance compared to the comparative example with no primer or lacquer applied.

The invention claimed is:

1. A flame retardant material comprising:
   (a) a substrate;
   (b) a coating on the substrate, the coating comprising a flame retardant polyolefin composition (X) comprising:
       (i) an ethylene based plastomer with a density in the range of 0.857 to 0.915 g/cm$^3$ and an MFR$_2$ (190° C.; 2.16 kg) in the range 0.5-30 g/10 min;
       (ii) a propylene based plastomer with a density in the range of 0.850 to 0.910 g/cm$^3$ and an MFR$_2$ (230° C./2.16 kg) in the range 0.01-30 g/10 min; and
       (iii) a flame retardant (FR);
   (c) a primer layer on top of the coating; and
   (d) a lacquer topcoat on top of the primer layer.

2. The flame retardant material of claim 1, wherein the flame retardant polyolefin composition (X) comprises:
   a flame retardant (FR);
   A) 5 to 35 wt. %, based on the overall weight of the flame retardant polyolefin composition, of a recycled polyolefin fabric substrate; wherein said recycled polyolefin fabric substrate is coated with a polymer composition (p1) comprising the following components:
       a1) an ethylene based plastomer with a density in the range of 0.857 to 0.915 g/cm$^3$ and a MFR$_2$ (190° C., 2.16 kg) in the range of 0.5 to 30 g/10 min; and
       a2) a propylene based plastomer in the range of 0.850 to 0.910 g/cm$^3$ and a MFR$_2$ (230° C., 2.16 kg) in the range of 0.01 to 30 g/10 min;
   B) 65 to 95 wt. % based on the overall weight of the flame retardant polyolefin composition of a homopolypropylene or a recycled polymer blend comprising b1) polypropylene and b2) polyethylene, wherein the weight ratio of b1) to b2) is from 3:7 to 12:1; and
   C) optionally one or more additives;
   with the proviso that the amounts of the flame retardant (FR) and components A), B), and C) (when present) add up to 100 wt. %.

3. The flame retardant material of claim 1, comprising:
   20 to 90 wt % of the ethylene based plastomer (i), relative to the total weight of the polyolefin composition (X) as a whole,
   5 to 45 wt % of the propylene based plastomer (ii), relative to the total weight of the polyolefin composition (X) as a whole,
   or a combination thereof.

4. The flame retardant material of claim 1, wherein the polyolefin composition (X) further comprises a high melt flow rate propylene based plastomer.

5. The flame retardant material of claim 1, wherein:
   the ethylene based plastomer (i) is a copolymer of ethylene and at least one C3-C10 alpha-olefin,
   the propylene based plastomer (ii), is a copolymer of propylene and ethylene or a C4-C10 alpha-olefin,
   or a combination thereof.

6. The flame retardant material of claim 1, wherein the flame retardant is present in an amount of 1.5 to 30 wt %, relative to the total weight of the polyolefin composition (X) as a whole.

7. The flame retardant material of claim 1, wherein the flame retardant comprises an ammonium polyphosphate.

8. The flame retardant material of claim 1, wherein the primer is an acrylic-modified polyethylene.

9. The flame retardant material of claim 1, wherein the lacquer topcoat comprises a polyurethane or a fluoropolymer.

10. The flame retardant material of claim 1, wherein the substrate is a fabric substrate.

11. The flame retardant material of claim 1, wherein the substrate is a polypropylene fabric.

12. An article comprising the flame retardant material of claim 1, wherein the article is selected from the group consisting of office furniture, vehicle interiors, seat cushions, back rest cushions, pillows, upholstered furniture, bed mattresses, wall coverings, shoes, sports bags, inlay of ski boots, sports equipment, carpets, rubber boats, PVC swimming pools, life vests, handbags, purses, table coverings, table mats, stationary, saddlebags, and tool bags.

13. The flame retardant material of claim 1, wherein the coating is corona treated.

14. The flame retardant material of claim 1, wherein the flame retardant polyolefin composition (X) comprises:
   a flame retardant (FR);
   A1) 5 to 35 wt. %, based on the overall weight of the flame retardant polyolefin composition, of a recycled polyolefin fabric substrate; wherein said fabric substrate is coated with a polymer composition (p2) comprising the following components:

a11) an ethylene based plastomer with a density in the range of 0.857 to 0.915 g/cm$^3$ and a MFR$_2$ (190° C., 2.16 kg) in the range of 0.5 to 30 g/10 min; and
a12) a propylene based plastomer in the range of 0.850 to 0.910 g/cm$^3$ and a MFR$_2$ (230° C., 2.16 kg) in the range of 0.01 to 30 g/10 min;

B1) 65 to 95 wt. % based on the overall weight of the flame retardant polyolefin composition of a virgin polyolefin composition (p3) comprising the following components:
b11) an ethylene based plastomer with a density in the range of 0.857 to 0.915 g/cm$^3$ and a MFR$_2$ (190° C., 2.16 kg) in the range of 0.5 to 30 g/10 min; and
b12) a propylene based plastomer with a density in the range of 0.850 to 0.910 g/cm$^3$ and a MFR$_2$ (230° C., 2.16 kg) in the range of 0.01 to 30 g/10 min; and C1) optionally one or more additives;

with the proviso that the amounts of the flame retardant (FR) and components A1), B1), and C1) (when present) add up to 100 wt. %.

15. The flame retardant material of claim 1, wherein the flame retardant comprises an ammonium polyphosphate in combination with a silane functionalized ethylene copolymer.

16. The flame retardant composition material of claim 15, wherein the silane functionalized ethylene copolymer comprises a copolymer of ethylene with a methylacrylate comonomer and a vinyl trimethoxysilane comonomer.

17. A process for producing the flame retardant material of claim 1, the process comprising:
(A) providing a coated substrate, the coated substrate being the substrate coated with the coating comprising the flame retardant polyolefin composition (X);
(B) applying the primer layer to the coated substrate of step (A);
(C) applying the lacquer topcoat on top of the primer layer; and
(D) optionally embossing the resulting flame retardant material.

18. The process of claim 17, wherein the coated substrate is prepared by applying the coating of the polyolefin composition (X) to the substrate.

19. The process of claim 17, further comprising corona treating the coated substrate before application of the primer layer.

* * * * *